(12) United States Patent
Nahum

(10) Patent No.: US 7,065,258 B2
(45) Date of Patent: Jun. 20, 2006

(54) SYSTEMS AND METHODS FOR REDUCING ACCUMULATED SYSTEMATIC ERRORS IN IMAGE CORRELATION DISPLACEMENT SENSING SYSTEMS

(75) Inventor: Michael Nahum, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 624 days.

(21) Appl. No.: 09/860,636

(22) Filed: May 21, 2001

(65) Prior Publication Data
US 2002/0179819 A1 Dec. 5, 2002

(51) Int. Cl.
*G06K 9/64* (2006.01)
*H01L 27/00* (2006.01)
*G09G 5/00* (2006.01)

(52) U.S. Cl. .................... 382/278; 250/208.1; 345/613

(58) Field of Classification Search ................ 382/278, 382/287, 289, 294, 295, 299, 300, 305, 312; 345/613, 672; 356/614; 250/208.1
See application file for complete search history.

(56) References Cited

U.S. PATENT DOCUMENTS

| 4,967,093 | A | | 10/1990 | Takemori |
| 5,901,003 | A | * | 5/1999 | Chainer et al. ............. 360/51 |
| 6,246,482 | B1 | * | 6/2001 | Kinrot et al. ............. 356/499 |
| 6,248,994 | B1 | * | 6/2001 | Rose et al. ............. 250/231.13 |
| 6,259,826 | B1 | * | 7/2001 | Pollard et al. ............. 382/284 |
| 6,584,215 | B1 | * | 6/2003 | Mahner ..................... 382/108 |
| 2002/0105656 | A1 | * | 8/2002 | Nahum et al. ............. 356/614 |

FOREIGN PATENT DOCUMENTS

| EP | 1 160 538 A1 | 5/2001 |
| JP | 05-018714 | 1/1993 |
| JP | 08-271231 | 10/1996 |

OTHER PUBLICATIONS

Hubert W. Schreier et al. "Systematic Errors in Digital Image Correlation Caused By Intensity Interpolation", *Optical Engineering*, vol. 39, No. 11, Nov. 2000.

\* cited by examiner

*Primary Examiner*—Kanjibhai Patel
(74) *Attorney, Agent, or Firm*—Oliff & Berridge, PLC

(57) ABSTRACT

A reference image updating method and apparatus used in an image-correlation system which updates a reference image when predetermined control parameters are met. An image corresponding to a displacement of a surface is captured and stored. A reference image and the captured image are compared at different offsets in a displacement direction. When the displacement falls within set predetermined displacement values or a predetermined value for a sample time that corresponds to the displacement, then the reference image is updated. By updated the reference image in this manner, systematic errors are prevented from accumulating thereby significantly removing systematic errors in the image-correlation system.

32 Claims, 14 Drawing Sheets

SYSTEMS AND METHODS FOR REDUCING ACCUMULATED SYSTEMATIC ERRORS IN IMAGE CORRELATION DISPLACEMENT SENSING SYSTEMS

BACKGROUND OF THE INVENTION

1. Field of Invention

This invention is directed to image correlation systems.

2. Description of Related Art

Various known devices use images acquired by a sensor array, and correlation between images acquired by the sensor array, to determine deformations and/or displacements. For example, one class of such devices is based on acquiring a speckle image generated by illuminating an optically rough surface with a light source. Generally, the light source is a coherent light source, such as a laser-generating light source. Such laser-generating light sources include a laser, laser diode and the like. After the optically rough surface is illuminated by the light source the light scattered from the optically rough surface is imaged onto an optical sensor. The optical sensor can be a charge-couple device (CCD), or a semi-conductor image sensor array, such as a CMOS image sensor array or the like.

Prior to displacing or deforming the optically rough surface, a first or reference speckle image is captured and stored. Then, after displacing or deforming the optically rough surface, a second or subsequent speckle image is captured and stored. The reference and second speckle images are then compared on a pixel-by-pixel basis. In general, a plurality of comparisons are performed. In each comparison, the reference and second speckle images are offset, or spatially translated, relative to each other. Between each comparison, the amount of offset, or spatial translation, is increased by a known amount, such as one image element, pixel, or an integer number of image elements or pixels.

In each comparison, the image value of a particular pixel in the reference image is multiplied by, or subtracted from, the image value of the corresponding second image pixel, where the corresponding second image pixel is determined based on the amount of offset. The value resulting from each pixel-by-pixel operation is accumulated to determine a correlation value for that comparison between the reference and second images. That correlation value is then, in effect, plotted against the offset amount, or spatial translation position, for that comparison to determine a correlation function value point. The offset having the greatest correlation between the reference and first images will generate a peak, or a trough, depending on how the pixel-by-pixel comparison is performed, in the plot of correlation function value points. The offset amount corresponding to the peak or trough represents the amount of displacement or deformation between the reference and second speckle images.

In image correlation systems where sub-pixel resolution and accuracy is needed, the sub-pixel resolution is obtained by sub-pixel interpolation. In known laboratory-type systems, sub-pixel interpolation is conventionally performed by fitting a continuous function to the discrete pixel-by-pixel points of a conventional cross-correlation function, locating the extremum, or peak, of the fitted function with sub-pixel resolution, and assuming the extremum or peak, location is the best estimate of the true offset between the reference and second images, and thus of the associated displacement. It is also known to apply a similar procedure to synthetic images that are created at sub-pixel steps by interpolating between the adjacent raw pixel values to create synthetic pixel values, as though an image were taken with the pixels located at the desired sub-pixel location.

In conventional image correlation systems and high-accuracy laboratory systems where sub-pixel resolution is needed, systematic displacement errors within a sub-pixel are introduced when determining a displacement between the reference image and the second image to a sub-pixel resolution. For example, systematic displacement errors caused by an interpolation method used in a cross-correlation algorithm can be introduced into the sub-pixel image correlation. Systematic errors in determining the displacement can be influenced by many factors, such as the frequency content of the speckle pattern, amplitude attenuation and the phase error of the interpolator used in the correlation. Systematic errors in determining the displacement can also be influenced by the type of interpolation function used to model the correlation function, such as linear, quadratic, Gaussian, etc.

U.S. patent application Ser. No. 09/731,671 which is incorporated herein by reference, discloses systems and methods for high/accuracy displacement determination in a correlation-based position transducer. In the 671 application, a system is provided that estimates the sub-pixel displacement of images in correlation-based position transducers and the like. The system then rejects the systematic displacement estimation errors present when conventional sub-pixel estimation methods are applied to a number of correlation function value points, especially when the correlation function value points are arranged asymmetrically. However, the systems and methods disclosed in the 671 application fail to reduce the accumulation of any systematic displacement errors which may be present when determining the relative position of a current reference speckle image and a new reference speckle image.

U.S. Pat. No. 967,093 to Takemori discloses systems and methods for measuring deformation of an object using speckle image correlation. In particular, Takemori describes various conventional methods for comparing two speckle images, and for determining when to update a current reference speckle image with a new reference speckle image. However, the methods of Takemori fail to recognize, or account for, the systematic displacement errors which may be present when determining the relative position of a current reference speckle image and a new reference speckle image. Furthermore, Takemori does not indicate any method of compensating or selecting reference speckle images with good sub-pixel accuracy and resolution. Accordingly, the measurements provided by the system in Takemori incorporate the accumulation of systematic displacement errors.

Japanese Patent Application JP 07069302 to Kamegawa discloses a speckle-image based displacement meter and method that reduces the error accumulation by storing a series of reference images, and by recalling selected ones of those reference images as comparison images that correspond to an appropriate displacement storing operation of the displacement meter. In comparison to previous conventional methods, the method of JP 07069302 reduces certain displacement errors which would otherwise accumulate over extended displacement ranges. However, the methods of JP 07069302 fail to recognize or account for the systematic displacement errors which may be present when determining the relative position of one reference image relative to another reference image. Furthermore, JP 07069302 does not disclose any method of compensating or selecting reference speckle images with good sub-pixel accuracy and resolution. Accordingly, the measurements from the image correlation system in JP 07069302 either must be made using an external displacement reference or systematic displacement errors will accumulate if an external reference is not used when obtaining the series of reference images.

In the article, "Systematic Errors in Digital Image Correlation Caused by Intensity Interpolation," by Hubert Schreier, systematic displacement errors are described which correspond to the method of sub-pixel image correlation applied to speckle images. Furthermore, the article discloses information relating to reducing the magnitudes of the systematic displacement errors themselves. However, Schreier does not disclose or suggest any method for determining or selecting the relative displacements between a set of reference images so that the systematic displacement errors may be compensated for, or controlled for, for displacement ranges beyond one image frame.

SUMMARY OF THE INVENTION

As previously discussed, in conventional image correlation systems, systematic displacement errors within a sub-pixel are introduced when determining a displacement between the reference image and the second image to a sub-pixel resolution. Such systematic displacement errors are also prevalent when determining the relative position of a current reference image and a new reference image. By updating a reference image with a new reference image usable to determine the relative position, in an accurate and timely manner with due regard to predetermined systematic displacement error characteristics, accumulation of systematic displacement errors in the sub-pixel correlation system can be significantly reduced.

In both conventional image correlation devices and laboratory systems that use image correlation in high-accuracy positioning and the like, the practical problems from systematic displacement errors that effectively prevent determining position to a high resolution and accuracy in a commercially marketable form have not been adequately considered. In particular, these conventional devices and high-accuracy laboratory systems and the like have given insufficient consideration to reducing the accumulation of the systematic displacement errors associated with determining a displacement of images to a sub-pixel resolution, and the accumulation of these errors, while simultaneously achieving an accuracy that is on the same order as the resolution. That is, these conventional devices and high-accuracy laboratory systems and the like have given insufficient consideration to the accumulation of systematic displacement errors when the displacement exceeds the bounds of the reference images.

For all of the above-outlined conventional methods for determining accumulated displacements, the inventor has observed that the contributions from systematic sub-pixel interpolation errors will be present in the apparent displacements between the reference images used to determine the accumulated displacement of the system. These systematic displacement errors have been ignored when determining the relative displacement between an image subsequently used as a reference image and an image previously used as a reference image. Thus, the accuracy and meaningful resolution of conventional systems degrades accordingly as the systematic displacement errors accumulate over displacement ranges extending beyond an image size. The meaningful resolution, accuracy and utility of these conventional systems is therefore limited.

Thus, considering the inaccuracies caused by systematic displacement errors that are present when determining the relative position of a current reference image and a new reference image, and the desire to achieve an accuracy that is on the same order as the resolution, conventional methods do not offer a reasonable solution for reducing the accumulation of displacement error due to the systematic displacement errors that occur when switching between reference images. In particular, in the prior art, since the nature of these systematic displacement errors was not considered when selecting a new reference image to be used in place of a current reference image, the individual systematic displacement error that occurred in any such switch was random, i.e., uncorrelated, relative to the other displacement errors that occur in other such switches. Thus, due to this random nature of the individual systematic displacement errors, the net accumulated systematic displacement error cannot be easily compensated for.

Accordingly, there is a need for new technique that will significantly reduce the accumulation of systematic displacement errors due to switching between reference images in image correlation systems, i.e., the displacement error that accumulates when determining the relative position offset between a current reference image and a new reference image.

This invention provides improved systems and methods for reducing accumulated systematic displacement errors in a correlation displacement sensing system.

This invention separately provides systems and methods for reducing the accumulated systematic displacement error in image correlation systems that require sub-pixel resolution.

This invention separately provides systems and methods for reducing accumulated systematic errors in an image correlation displacement sensing system such as a correlation-based position transducer and the like.

This invention separately provides systems and methods that eliminate the need to select reference images by performing calculations in real time.

This invention separately provides systems and methods where each new reference image can be acquired with a relative displacement to the previous reference image at a relative offset that reduces the accumulated position error.

This invention separately provides systems and methods that reduce the net accumulated systematic displacement error.

This invention separately provides systems and methods for rejecting systematic errors that accumulate over a displacement range by methods which determine the displacement between a current reference image and a new reference image by relying on knowledge of the behavior of the systematic errors.

This invention separately provides systems and methods that are especially suitable for measuring displacement of a surface using speckle images.

The systems and methods according to this invention will be described with respect to sensor "images," where the term "image" is not limited to optical images, but refers more generally to any one-dimensional, two-dimensional or higher-dimensional, arranged set of sensor values. Similarly, the term "pixel" as used herein is not limited to optical picture elements, but refers more generally to the granularity of the one-dimensional, two-dimensional or higher-dimensional arranged set of sensor values. It should be appreciated that the term "image" is not limited to entire images but refers more generally to any image portion that includes a one-dimensional, two-dimensional, or higher-dimensional arranged set of sensor values.

In various exemplary embodiments of the correlation systems and methods according to this invention, various systematic displacement errors, which arise when conventional sub-pixel methods are used to determine the displacement between a current reference image and a new reference image, when the current reference image is replaced with a new reference image, are avoided or reduced by replacing a current reference image with a new reference image that is selected based on one or more control parameters determined based on the current reference image.

In various other exemplary embodiments of the correlation systems and methods according to this invention, the systems and methods are particularly well-suited for application to speckle images.

In various other exemplary embodiments of the correlation systems and methods according to this invention, the systems and methods are particularly well-suited to reducing accumulated systematic errors in an image correlation with speckle-image type readheads at high speed with high accuracy.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
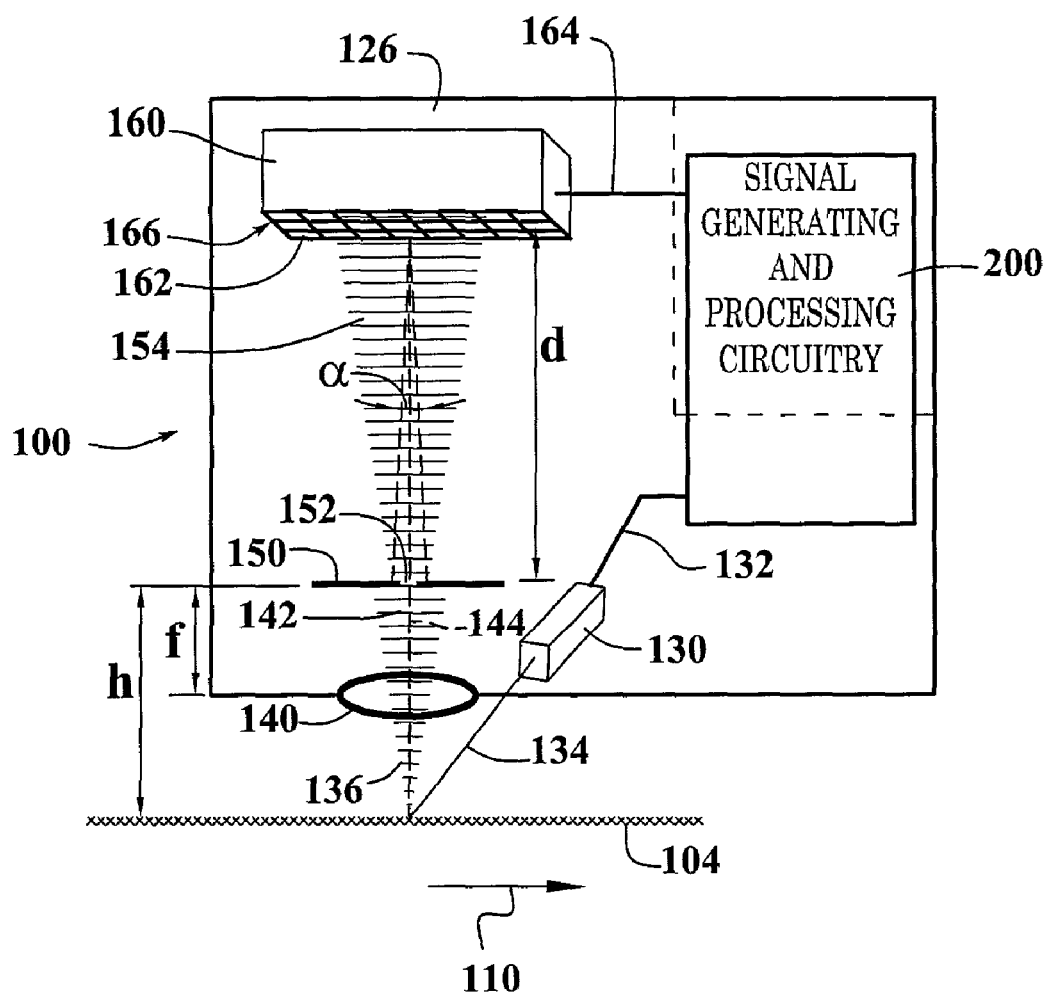
FIG. 1 is a block diagram of a speckle-image correlation optical position transducer.

FIG. 1 is a block diagram of a speckle-image-based optical position transducer 100. The speckle-image-based optical position transducer 100, as well as various suitable mechanical and optical configurations, image correlation methods, and associated signal processing circuitry, are described in greater detail in co-pending U.S. application Ser. No. 09/584,264, incorporated herein by reference in its entirety.

The speckle-image-based optical position transducer 100 shown in FIG. 1 includes a readhead 126, signal generating and processing circuitry 200 and an optically rough surface 104. In FIG. 1, the components of the readhead 126, and their relation to the optically rough surface 104, are shown schematically in a layout that generally corresponds to an exemplary physical configuration, as further described below.

In particular, the optically diffusing, or optically rough, surface 104 is positioned adjacent to an illuminating and receiving end of the readhead 126, such that when optically rough surface 104 is illuminated by light emitted from that end of the readhead 126 by a light source 130, the emitted light is scattered back from the optically rough surface 104 towards the image receiving optical elements positioned at that end of the readhead 126. The optically rough surface 104 may be part of a specially-provided element, or it may be provided as an integral surface of a separately-existing mechanism.

In either case, the optically rough surface 104 is positioned at a generally stable distance from the light source and an optical system housed in the readhead 126, and moves relative to readhead 126 along at least one prescribed axis of relative motion, such as a measuring axis 110 in FIG. 1. The relative motion is generally constrained by conventional guideways or bearings (not shown) mounted to a frame that maintains the proper relative position between the readhead 126 and the optically rough surface 104. The readhead 126 may include an alignment feature (not shown) which aids in mounting the readhead 126, and aligns the internal components of the readhead 126 relative to the mounting frame and/or the expected axis of relative motion of the optically rough surface 104.

As shown in FIG. 1, the image receiving optical elements of the readhead 126 include a lens 140 positioned at the illuminating and receiving end of the readhead 126 such that the optical axis of the lens 140 is generally aligned with the illuminated spot on the optically rough surface 104. The readhead 126 further includes a pinhole aperture plate 150, spaced apart from the lens 140 along an optical axis, and a light detector 160 spaced apart from the aperture plate 150 along the optical axis, as shown in FIG. 1. The light detector 160 can be any known or later-developed type of light sensitive material or device that can be organized into an array of independent and individual light sensing elements, such as a camera, an electronic or digital camera, a CCD array, an array of CMOS light sensitive elements, or the like.

An exemplary spacing and positioning of the optically rough surface 104 and the readhead 126, including the lens 140, the aperture plate 150, and the light detector 160, is further described below and in the incorporated 264 application. The mounting of the light source 130, the lens 140, the aperture plate 150, and the light detector 160 in the housing of the readhead 126 may be done according to conventional methods of miniature optical system construction and/or industrial camera construction, provided that the components are mounted in a precise and stable manner.

When the readhead 126 is suitably positioned adjacent to the optically rough surface 104, each image captured by the light detector 160 will contain a random pattern of relatively bright spots, or speckles, where the diffracted light waves from the optically rough surface 104 combine positively to form a peak, and relatively dark spots where the diffracted light waves from the optically rough surface 104 combine negatively to cancel out. The random pattern corresponding to any illuminated portion of the optically diffusing, or optically rough, surface 104 is unique, and the optically rough surface 104 can therefore act as a displacement reference without the need for any special marks.

The light detector 160 has an array 166 of image elements 162 spaced apart along at least one axis at a known spacing. The known spacing provides the basis for measuring the displacement or offset between two images projected onto the light detector 160, and thus also provides the basis for measuring the displacement of the surface that determines the images, i.e., the optically rough surface 104.

In addition, the readhead 126 includes at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely. The signal generating and processing circuitry 200 is described in greater detail below, with respect to FIGS. 13–16.

Additional details regarding the structure and operation of this and other embodiments of the speckle-image-based optical position transducer 100 are provided below, and in the incorporated 264 application.

As shown in FIG. 1, a light beam 134 is emitted by the light source 130 and is directed onto the optically diffusing, or optically rough, surface 104 to illuminate a portion of the optically diffusing, or optically rough, surface 104. As a result, the illuminated portion of the optically diffusing, or optically rough, surface 104 both scatters and diffracts light about the optical axis 144.

When the light source 130 is a white-light source, the light will generate an image of the illuminated portion, which can be projected onto the array 166 of the image elements 162. However, while this image can be correlated in the same way that a speckle image can be correlated, this image will not include speckles formed by scattering from the optically diffusing, or optically rough, surface 104.

When the light source 130 is coherent and is driven by the drive signal on the signal line 132 and outputs the light beam 134 as a coherent light beam, the coherent light beam 134 illuminates a portion of the optically diffusing, or optically rough, surface 104. The illuminated portion lies along the optical axis 144 of the optical system of the readhead 126. In particular, the light 136 scattered from the illuminated portion of the optically diffusing, or optically rough, surface 104 is gathered by the lens 140.

The lens 140 then projects the collected light 142 from the illuminated portion of the optically diffusing, or optically rough, surface 104 onto the pinhole aperture plate 150 having the pinhole aperture 152. The lens 140 is spaced from the plate 150 by a distance f, which is equal to the focal length of the lens 140.

The pinhole aperture plate 150 is spaced from the illuminated portion of the optically diffusing, or optically rough, surface 104 by a distance h.

By locating the plate 150 at the focal distance f of the lens 140, the optical system of the speckle-image-based optical position transducer becomes telecentric. Moreover, by using the pinhole 152 in the pinhole plate 150, the speckle size and the dilation of the speckle pattern depends solely on the dimensions of the pinhole 152 and, more particularly, becomes independent of any lens parameters of the lens 140.

The collected light 142 from the lens 140 passes through the pinhole 152. In particular, the light 154 passed by the pinhole 152 is projected along the optical axis 144 and onto the array 166 of the image elements 162 of the light detector 160. The surface of the array 166 of the light sensitive elements 162 is separated from the plate 150 by a distance d. The speckle size depends only on the angle α subtended by the dimensions of the pinhole 152 and the distance d between the pinhole plate 150 and the surface formed by the array 166 of image elements 162 of the light detector 160.

The approximate size D of the speckles within the detected portion of the light received from the illuminated portion of the optically diffusing, or optically rough, surface 104 onto the array 166 of the image elements 162 is:

$$D \approx \lambda/\tan(\alpha) = (\lambda * d)/w \qquad (1)$$

where:
$\lambda$ is the wavelength of the light beam 134;
d is the distance between the pinhole plate 150 and the surface of the array 166;
w is the diameter of a round pinhole 152; and
α is the angle subtended by the dimension w at a radius equal to distance d.

In various exemplary embodiments, typical values for these parameters of the optical position transducer 100 include: $\lambda=0.6$ μm, d=10 cm ($10^5$ μm), and w=1 mm ($10^3$ μm). As a result, the approximate speckle size D is 60 μm.

To achieve high resolution, the average speckle size is most usefully approximately equal to, or larger than, the pixel size of the image elements 162 of the light detector 160. Moreover, in various embodiments of the readhead 126, the average speckle size is approximately two times to ten times the pixel spacing of the image elements 162.

To acquire an image, the signal generating and processing circuitry 200 outputs a drive signal on the signal line 132 to drive the coherent light source 130 to emit the coherent light beam 134. The light beam 134 illuminates a portion of the optically rough surface 104, which is imaged onto the array 166 of the image elements 162 of the light detector 160. The signal generating and processing circuitry 200 then inputs a plurality of signal portions over the signal line 164, where each signal portion corresponds to the image value detected by one or more of the individual image elements 162.

To determine a displacement of the optically rough surface 104 between any two images, the signal portions for a first image received from the light detector 160 by the signal generating and processing circuitry 200 are stored in memory. A short time later, the signal generating and processing circuitry 200 again drives the coherent light source 130 and inputs a second image signal from the light detector 160 over the signal line 164. Generally, the second image must be generated and acquired within a short time period after the first image is acquired, depending on the displacement speed of the optically rough surface 104. The time period must be short enough to insure that the first and second images "overlap" sufficiently. That is, the time period must be short enough to insure that a pattern of image values present in the first image is also present in the second image, so that a significant correlation between the two images can be determined.

However, in some exemplary embodiments, it may be desirable to store one or more reference images corresponding to a particular position for periods longer than the time period for obtaining the next displaced image. That is, rather than using the current second image as the first image for the next sampled image, a current reference image is repeatedly used for a succession of displaced images. In general, the current reference image can be used until the current reference image and the current displaced image no longer overlap sufficiently to generate a strong correlation peak or trough. In this way, there is no accumulation of position errors between the successive images, as in the prior art technique.

That is, at some point, the current displaced image will reach a relative displacement that indicates that a future displaced image may not sufficiently overlap the current reference image. At that point, a new reference image should be identified and the current reference image should be replaced or updated with the identified new reference image. In accordance with the systems and methods of this invention, the new reference image is selected from at least some of the succession of displaced images obtained since the current reference image was first used, such that the position error that has accumulated due to systematic displacement errors present at switching between the successive reference images is known, reduced or ideally eliminated.

The current reference image and the current displaced image are processed to generate a correlation function. In practice, the current displaced image is shifted digitally relative to the current reference image over a range of offsets, or spatial translation positions, that includes an offset that causes the pattern of the two images to most nearly align. The correlation function indicates the degree of pattern alignment, and thus indicates the amount of offset required to get the two images to align as the images are digitally shifted.

Figure 2:
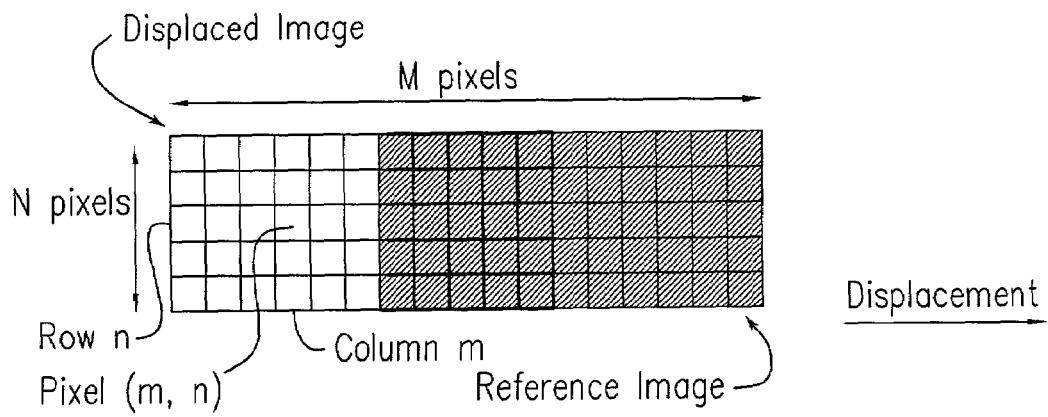
FIG. 2 illustrates the relationship between the current reference and displaced images and the portions of the current reference and displaced images used to generate the correlation values according to a first technique.
Figure 5:
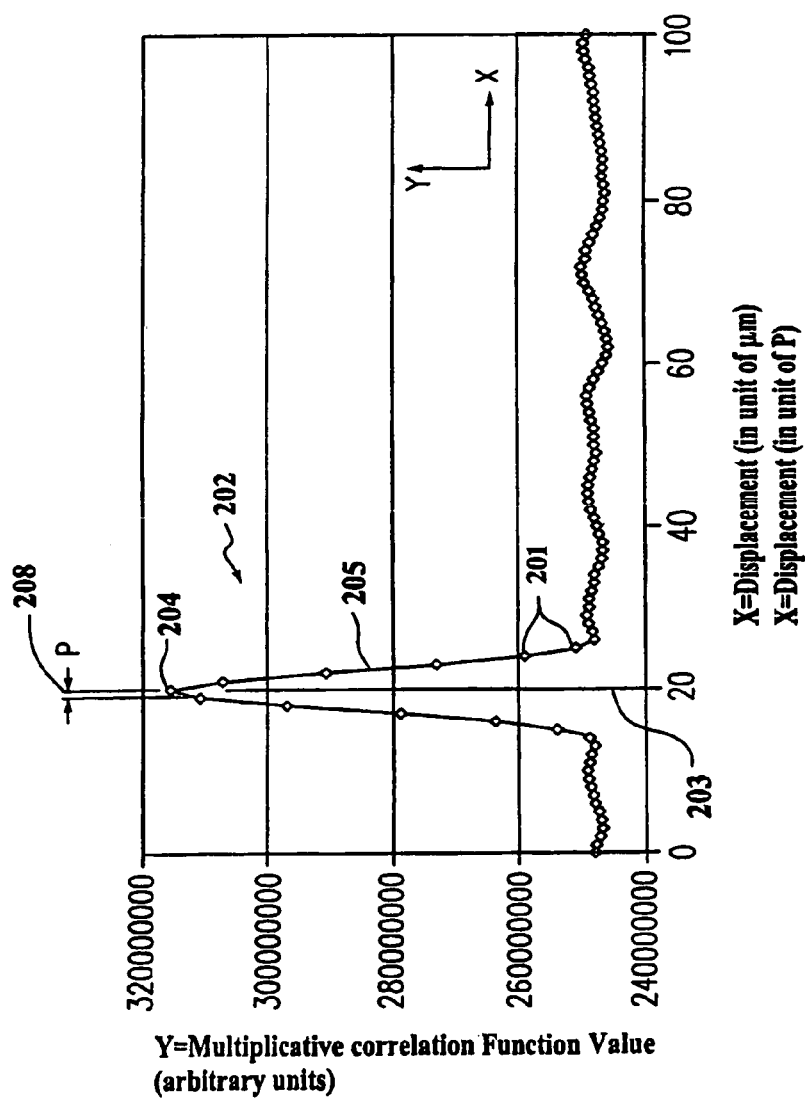
FIG. 5 is a graph illustrating the results of comparing first and second images by a conventional multiplicative correlation function, when the images are offset at successive pixel displacements.

It should be appreciated that there are a number of different techniques for comparing the current reference image to the current displaced image. For example, as shown in FIG. 2, in a first exemplary technique, the entire frame of the current displaced image is compared on a pixel-by-pixel basis to the entire frame of the current reference image to generate a single correlation value. In this case, those pixels that lie in regions of the current reference and displaced images that do not overlap with a region of the other of the current reference and displaced images are compared to pixels having a default value, or are assigned a default comparison value, or the like. The series of correlation values, such as those shown in FIG. 5, is generated by shifting the current displaced image by one pixel relative to the current reference image after each comparison is performed.

Figure 3:
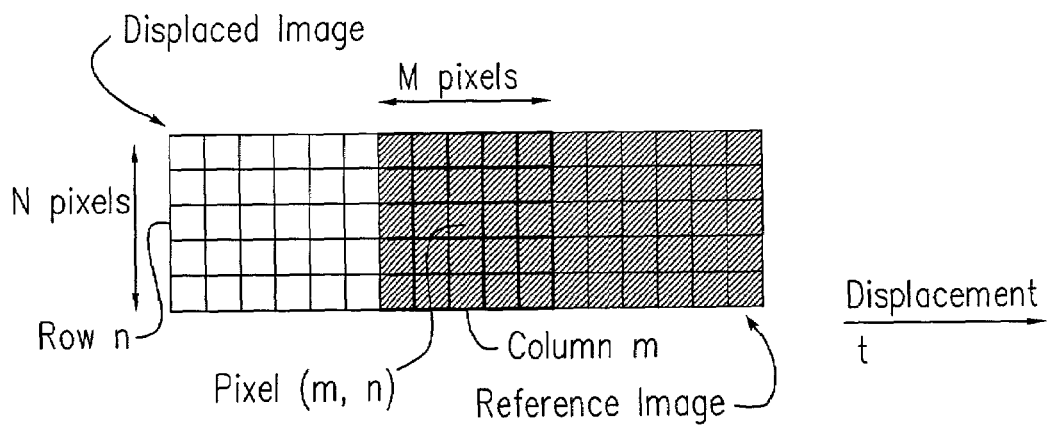
FIG. 3 illustrates the relationship between the current reference and displaced images and the portions of the current reference and displaced images used to generate the correlation values according to a second technique.

In a second exemplary technique, as shown in FIG. 3, the comparison is performed as a two-step process. In a first step, a one or more rows of the current displaced image is compared in full to the one or more corresponding rows of the current reference image to generate an approximate correlation value. A series of approximate correlation values, corresponding to those shown in FIG. 5, is generated by shifting the current displaced image by one pixel relative to the current reference image after each comparison is performed. Because only a small number of rows is compared, each comparison can be quickly generated. However, because only a small number of rows, rather than the entire image, is used, the correlation values obtained only approximate the correlation values that would be obtained from comparing all of the rows of the current displaced image to the corresponding rows of the current reference image. Nonetheless, the approximate correlation values do generally indicated the approximate amount of overlap between the current reference and displaced images.

Then, in the second step, the determined degree of overlap between the current reference and displaced images is used to determine, the portion of the current displaced image and the portion of the current reference image that will be compared to generated the correlation values. That is, only the correlation values that are around the correlation peak or trough are used to determine the interpolated sub-pixel displacement. Thus, only the correlation values around the correlation peak or trough need to be determined based on comparing more than single rows of the current displaced and reference images.

In this second step, for each amount of pixel offset between the current reference and displaced images around the approximate correlation peak or trough, only the overlapped regions of the current displaced and reference images are compared against each other on a pixel-by-pixel basis to generate a correlation value for that amount of pixel offset. Thus, for each amount of pixel offset, the size of the compared portions is different than for other amounts of pixel offset.

Figure 4:
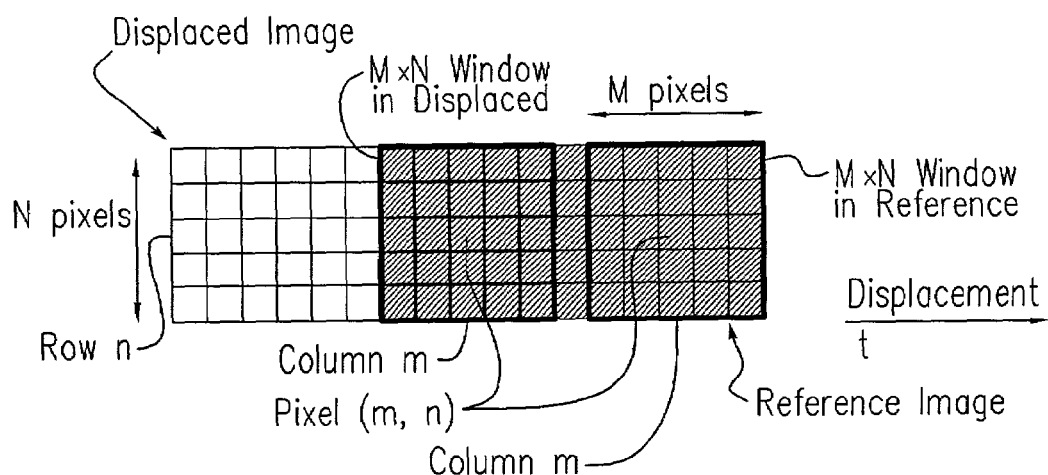
FIG. 4 illustrates the relationship between the current reference and displaced images and the portions of the current reference and displaced images used to generate the correlation values according to a third technique.

In a third exemplary technique, as shown in FIG. 4, a window having a predetermined extent along each direction of motion is used to select a portion of the current displaced image to be compared to the current reference image. In this case, the window is scanned across the current reference image to select a portion of the current reference image to be compared to the selected portion of the current displaced image to generate each correlation value. That is, for an offset value of zero, the window is aligned with one edge of the current reference image. As the offset value increases in pixel increments, the window is moved one pixel toward the opposite edge of the current reference image. The last offset value for which a correlation value is obtained occurs when the window reaches the opposite edge of the current reference image.

For example, in various exemplary embodiments of the third technique, the portion of the current displaced image has an extent along the direction of travel that is approximately ⅓ to ¼ of the frame length L of the current displaced image. This portion can be centered on the geometric center of the current displaced image. It should be appreciated that the window can have a fixed extent or can have an extent that varies based on a previously determined amount of displacement between the current reference and displaced images. In various exemplary embodiments, the size of the window can be selected, at least in part, to minimize the number of pixels that must be compared, while simultaneously ensuring that a strong correlation peak/trough will be obtained.

It should also be appreciated that, in various other exemplary embodiments of the third technique, the location of the portion can be based at least in part on the direction of displacement of the current displaced image relative to the current reference image. In this case, if the current displaced image was displaced to the right of the current reference image, the location of the portion of the current reference image would be offset to the left of center. Furthermore, in various other exemplary embodiments, the degree of offset of the portion can be based at least in part on the amount of displacement of the current reference image relative to the current reference image. In this way, the entire portion of the current displaced image can be kept within the bounds of the frame of the current reference image while the amount of relative displacement between the current reference and displaced images, before a new reference image must be used, can be increased.

For example, for various exemplary embodiments of a system that use the third exemplary technique, where images having a frame length L and a frame width N are captured, the current reference and displaced images will have frame lengths (in pixels) of L and frame widths N. In these exemplary embodiments, the extent M of the M×N portion of the current displaced image will be some fraction of the frame length L, or M=L/x, where x is any real number greater than 1. This M×N portion of the current displaced image will then be correlated with each M×N portion of the current reference image as an M×N window is stepped over the length of the current reference image from a first position where one edge of the M×N window is aligned with one edge of the current reference image to an [L−(M−1)]$^{th}$ position where the opposite edge of the M×N window is aligned with the opposite edge of the current reference image.

It should be appreciated that, in the second and third exemplary techniques, where only a portion of the current displaced image is compared to a correspondingly sized portion of the current reference image, a stronger correlation peak or trough compared to the background correlation value can be obtained. In this case, the current reference image should be updated when the portion of the current displaced image approaches the edges of the current reference image.

For a one-dimensional displacement, when the compared portions of each of the current reference image and the current displaced image each comprises M×N pixels arranged in a two-dimensional array of M rows of pixels and N columns of pixels, one common correlation algorithm is:

$$R(p) = \left[\sum_{n=1}^{N}\left(\sum_{m=1}^{M} I_1(m,n) * I_2(p+m,n)\right)\right] \quad (2)$$

where:
  R(p) is the correlation function value for the current offset value;
  p is the current offset value, in pixels;
  m is the current column;
  n is the current row;
  $I_1$ is the image value for the current pixel in the first image; and
  $I_2$ is the image value for the second image.

For a two-dimensional displacement, Eq. (2) can be modified by those skilled in the art two deal with the second dimension.

It should be appreciated that, in various exemplary embodiments, when the entire frame of the current reference image is compared to the entire frame of the current displaced image, cyclical boundary conditions are used. As indicated in Eq. (2), the correlation value for each row is obtained and the row correlation values are summed. The sum is then averaged over the M rows to obtain an average, and noise-reduced, correlation function value point. This averaging is desirable to ensure that the correlation function value points will be stable to roughly the resolution to be obtained by interpolating to determine the correlation function extremum. Thus, to obtain roughly nanometer resolution by interpolating to determine the correlation function extremum when each correlation function value point is offset by approximately 1 μm from adjacent correlation function value points, it is assumed that the correlation function value points need to be stable roughly to the desired nanometer resolution value.

FIG. 5 is a graph illustrating the results of comparing first and second images according to the previously-described conventional multiplicative correlation function method. In particular, the correlation function includes a plurality of discrete correlation function value points 201 that are separated along the x-axis by a predetermined offset increment corresponding to the pixel pitch P, as indicated by the distance 208. The predetermined offset increment can be directly related to a displacement increment of the optically rough surface 104 shown in FIG. 1. This displacement increment depends upon the effective center-to-center spacing between the individual image elements 162 of the array 166 in the direction corresponding to the measurement axis 110, which is also referred to as the pixel pitch P, in the following description, and the amount of magnification of the displacement of the optically diffusing, or optically rough, surface 104 by the optical system of the readhead 126.

For example, if the effective center-to-center spacing of the image elements 162 in the direction corresponding to the measurement axis 110 is 10 μm, and the optical system of the readhead 126 magnifies the surface displacement by 10×, then a 1 μm displacement of the illuminated portion of the optically diffusing, or optically rough, surface 104 will be magnified into a 10 μm displacement of the speckle pattern on the image elements 162.

Each correlation function value point 201 is generated by digitally shifting the second image relative to the first image by the effective center-to-center spacing of the image elements 162 in the direction corresponding to the measurement axis 110. Because, in this case, the effective center-to-center spacing of the image elements 162 corresponds to about a 1 µm displacement of the optically diffusing, or optically rough, surface 104, the discrete correlation function value points 201 will be separated by a displacement distance of about 1 µm. In particular, the correlation function of FIG. 5, which has correlation function values displayed in arbitrary units, will exhibit an extremum of the true continuous correlation function 205 at the offset value, or spatial translation position, where the image, or intensity, patterns in each of the first and second images best align.

Herein, the offset value in pixels associated with the extremum of a true continuous correlation function will be called the peak offset regardless of whether the underlying correlation function produces a peak or a trough, and the surface displacement corresponding to the peak offset will be called the peak displacement, or simply the displacement, regardless of whether the underlying correlation function produces a peak or a trough.

In the example shown in FIG. 5, the extremum of the true continuous correlation function 205 occurs at an offset of approximately 20 pixels or image elements 162, corresponding to a displacement of 20 µm, as indicated by the line 203. In FIG. 5, the extremum of the true continuous correlation function 205 is indistinguishable from the extreme correlation function value point 204. However, in general, the extremum does not necessarily occur at an offset, or spatial translation position, which is an integer multiple of the pixel spacing, and therefore does not precisely coincide with the extreme correlation function value point.

Conventionally, if sub-pixel resolution and accuracy are required, a function f(x) is numerically-fit to the correlation function value points which make up the correlation peak 202. Subsequently, the extremum for the numerically-fit function f(x) is found and the corresponding offset value, or spatial translation position, is identified as the best estimate of the peak offset for the first and second images. For example, to find the offset value corresponding to the extremum for the numerically-fit function f(x), the numerically-fit function f(x) is differentiated to determine the offset value x where the slope of f(x) is equal to zero.

When a multiplicative correlation function such as Eq. (2) is used, the correlation function is relatively curved in the region surrounding the peak or trough. Thus, the numerically-fit function f(x) is conventionally chosen to be a second-order or higher function. However, the inventor has found that such conventional methods for estimating the correlation function extremum at the sub-pixel level introduce non-negligible systematic displacement errors, such as those illustrated in FIG. 6.

Figure 6:
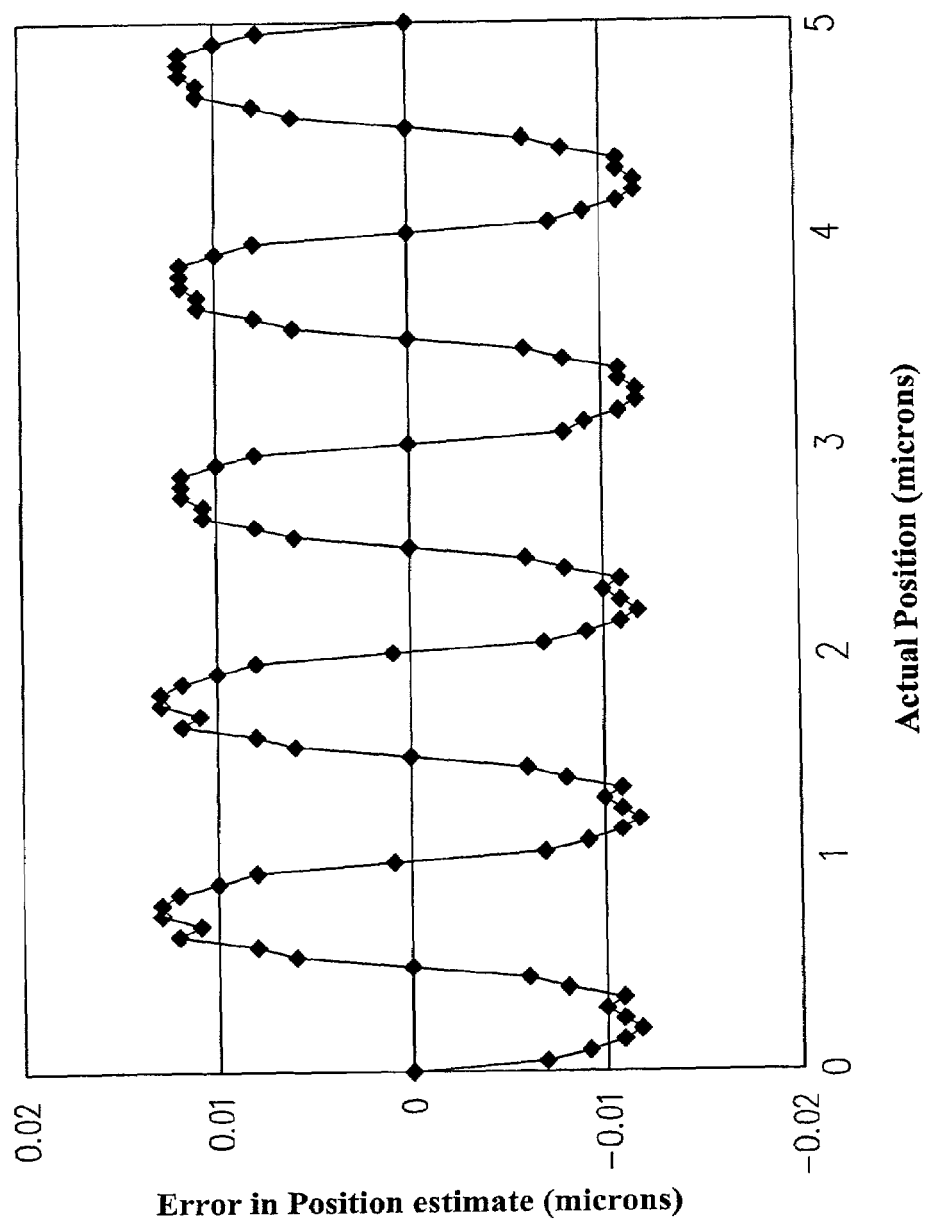
FIG. 6 is a graph illustrating the systematic displacement errors over a series of pixels.

In FIG. 6, a graph illustrates the results of comparing first and second images at the sub-pixel level according to the previously-described conventional multiplicative correlation function method. In FIG. 6, the error in estimating the position is periodic. The period of the estimation error corresponds to the pitch of a pixel spacing used to acquire the image. The inventor has found that such a periodic error curve is a typical systematic error in sub-pixel image correlation systems. The inventor has also found that this periodicity provides a pre-determined error characteristic which can be used, in various exemplary embodiments of the systems and methods according to this invention, as a basis for reducing or avoiding these systematic displacement errors, even without specifically determining the amplitude or detailed shape of the periodic error curve.

The inventor has furthermore found that such systematic displacement errors are relatively stable for a particular image correlation-based displacement measuring system, and are relatively similar for a plurality of similar image correlation-based displacement measuring systems. Thus, once they have been specifically determined for a particular image correlation-based displacement measuring system, such systematic displacement errors reveal at least one pre-determined error characteristic which can provide a basis for specifically compensating for or avoiding these systematic displacement errors during subsequent operation of that particular image correlation-based displacement measuring system. Furthermore, to the extent that a particular image correlation-based displacement measuring system is representative of a class of similar image correlation-based displacement measuring systems, the systematic displacement errors of any machine in that class may be similarly compensated for or avoided, to some extent, based on the pre-determined error characteristic of the particular representative image correlation-based displacement measuring system.

As the current reference image is switched to a new reference image as the readhead 126 is displaced along the optically rough surface 104, systematic displacement errors, such as those shown in FIG. 6, are present in the related measurements. Thus, as one reference image is switched to the next reference image, these systematic displacement errors can accumulate in an unobservable manner unless the systems and methods according to this invention are used to reduce such errors or accumulate such errors in a predictable manner.

Figure 7:
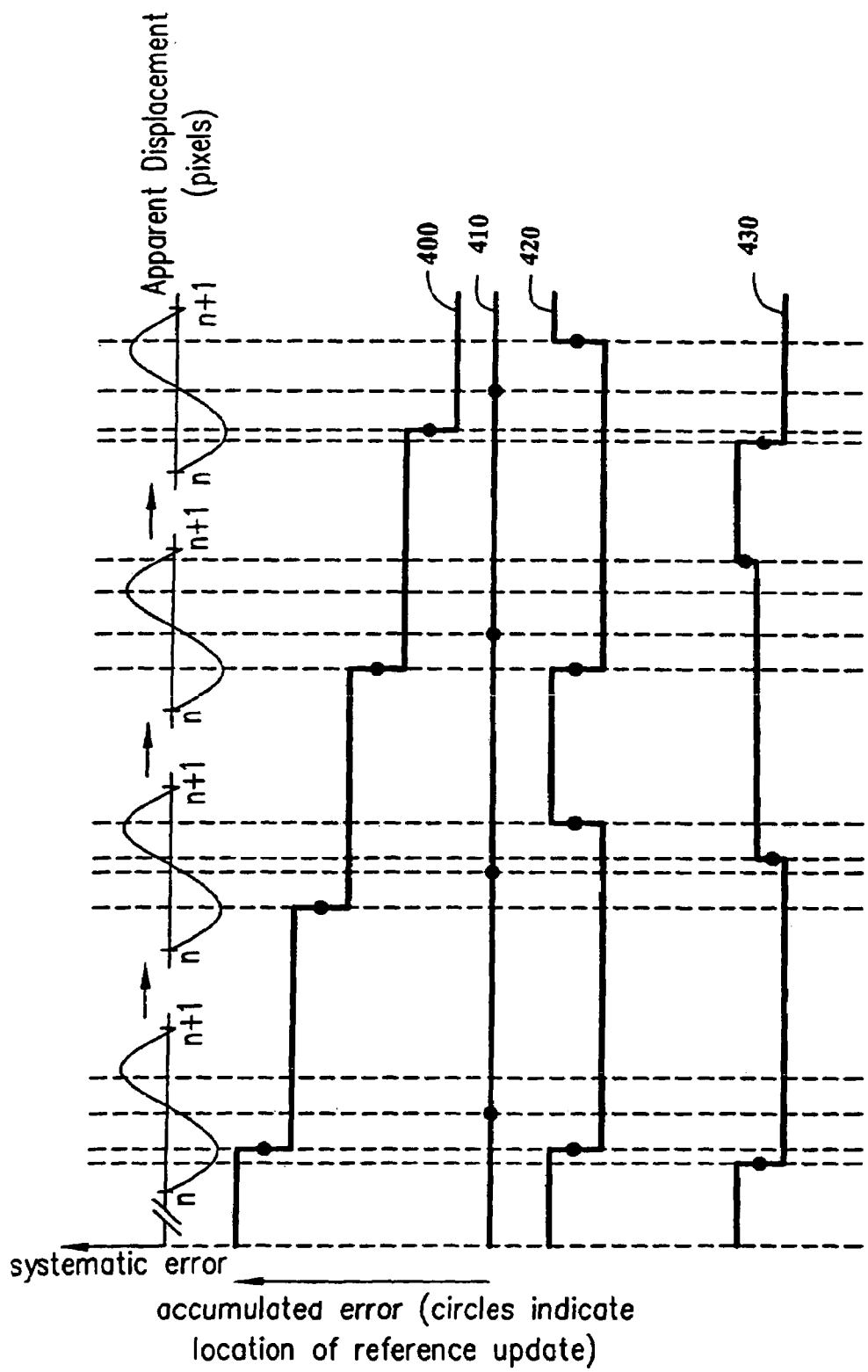
FIG. 7 is a graph illustrating how individual systematic displacement errors that occur between two images accumulate over a series of such images.

FIG. 7 shows four exemplary embodiments of how the systematic displacement errors can accumulate and then how the accumulated systematic displacement errors can be reduced, eliminated or known and thus compensated for, over a series of replacement events, according to the systems and methods of this invention. A replacement event occurs when a current reference image is replaced with a new reference image. A reference-class displacement is the relative displacement between two reference images, such as the displacement between a current reference image and its replacement new reference image.

As shown in FIG. 7, in a first exemplary embodiment illustrated by a first accumulated systematic displacement error curve 400, for each replacement event, the new reference image is selected from a set of candidate reference images or is acquired such that the location of that new reference image along the systematic displacement curve, such as that shown in FIG. 6, is known. Thus, in this case, the accumulated systematic error increases, but in known amounts, since the location of the relative displacement of the new reference image relative to the old reference image along the systematic displacement error curve is known.

Thus, for each replacement event, the amount of systematic displacement error can be accumulated in a known and predictable manner. As a result, the accumulated systematic displacement error can be subtracted from the total accumulated displacement for that new reference image to obtain a compensated accumulated displacement for that new reference image.

It should further be appreciated that, if the new reference image is selected or acquired at a prescribed displacement relative to the old reference image such that each new reference image is at approximately the same location on the systematic displacement error curve, it becomes necessary only to count the number of times a current reference image has been replaced to determine the accumulated systematic displacement error associated with the current reference image. That is, in this case, the accumulated systematic displacement error is the number of times the current reference image has been replaced times the amount of systematic displacement error associated with each replacement.

In a second exemplary embodiment illustrated by a second accumulated systematic displacement error curve 410, the new reference image is selected or acquired at a prescribed displacement relative to the old reference image such that each new reference image is at approximately the zero-crossing location on the systematic displacement error curve. In this case, the systematic displacement error associated with each replacement event is essentially zero. Thus, the accumulated systematic displacement error often stays close to zero. Moreover, even if the new reference image is not exactly located at the zero-crossing point of the systematic displacement error curve, the resulting amount of systematic displacement error for each replacement event is quite small, and thus accumulates slowly.

Furthermore, when a first new reference image is not exactly located at the zero-crossing point of the systematic displacement error curve, a second new reference image acquired as some later time is likely to be located on the opposite side of the zero crossing point along the systematic displacement error curve, relative to the first new reference image, such that the first and second new reference images are self-compensating relative to the accumulated systematic displacement error.

In a third exemplary embodiment illustrated by a third accumulated systematic displacement error curve 420, each new reference image is selected or acquired such that each new reference image is located along the systematic displacement error curve at a prescribed displacement relative to the old reference image at approximately the peak of the systematic displacement error curve or at the trough of the systematic displacement error curve, and such that each following new reference image is located along the systematic displacement error curve at one of a number of prescribed displacements relative to the old reference image at approximately the other of the peak or the trough of the systematic displacement error curve. In this way, the magnitude of the systematic displacement error associated with each new reference image is approximately the same, but need not be specifically determined. At the same time, the systematic displacement errors due to any two consecutive new reference images have opposite signs, such that the systematic displacement error due to one new reference image is offset by the systematic displacement error due to the next new reference image.

It should be appreciated that, in this third exemplary embodiment, the peaks and trough locations are not critical. That is, any set of locations along the systematic error curve can be used, so long as the locations in the set have equal but opposite systematic displacement errors.

In a fourth exemplary embodiment illustrated by a fourth accumulated systematic displacement error curve 430, for some replacement events, a new reference image is selected or acquired at a location along the systematic displacement error curve at a displacement relative to the old reference image that is dynamically prescribed or determined, or is statically prescribed, such that, when the systematic displacement error for this new reference image is added to the accumulated systematic displacement error that has accumulated due to a number of previous replacement events, at least the absolute value of the accumulated systematic displacement error is reduced. For example, as shown in the accumulated systematic displacement error curve 430 of FIG. 7, the second systematic displacement error, when accumulated with the first systematic displacement error, increases the accumulated systematic displacement error. Then, the third systematic displacement error, when accumulated with the accumulated systematic displacement error due to the first and second replacement events, offsets that accumulated systematic displacement error, reducing the accumulated systematic displacement error to essentially zero.

It should be appreciated that the absolute value of the third systematic displacement error could have been less than, or more than, the absolute value of the accumulated systematic displacement error. However, so long as the systematic displacement errors for some replacement events have a sign opposite that of the systematic displacement errors for other replacement events, that is within the scope of this invention. Furthermore, it should be appreciated that the systematic displacement error can accumulate over any number of replacement events, and can be offset by the total systematic displacement error due to any number of subsequent replacement events.

In the exemplary embodiments outlined above with respect to FIG. 7, it is assumed that the new replacement image can be acquired at the desired location along the systematic displacement error curve, or can be so selected from a set of candidate reference images. However, depending on the relative velocity between the readhead 126 and the optically rough surface 104 and/or the sample timing, it may not be possible to acquire such a new reference image at the desired location, or it may be that the set of candidate reference images does not have a candidate reference image located at the appropriate location along the systematic displacement error curve. This can occur, for example, when the readhead 126 is moving at a high velocity along the optically rough surface 104, such that only one or a few potential new reference images can be acquired before the offset between the current reference image and the current displaced image becomes too great.

This fourth exemplary embodiment illustrated by the fourth accumulated systematic displacement error curve 430 permits the systematic displacement error to accumulate over two or more replacement events, and then to be more or less offset by one or more replacement events, or to accumulate over one or more replacement events and then to be more or less offset by two or more replacement events. Thus, for example, the third exemplary embodiment can be modified, such that a next replacement event does not need to be located at a trough when the previous replacement event was located at a peak, or vice-versa. That is, two or more consecutive replacement events could be located at a peak or trough, so long as those replacement events are offset by more or less the same number of subsequent replacement events located at troughs or peaks, respectively, or are offsetting more or less the same number of earlier replacement events located at troughs or peaks, respectively.

Furthermore, it should be appreciated that the offsetting replacement event or events could offset less than, or more than, the accumulated systematic displacement error. Moreover, these accumulating and offsetting replacement events can be interleaved, need not be adjacent, or have any particular arrangement or organization. Thus, so long as the systematic displacement error of a subsequent new reference image is acquired at an available time or selected from the set of available candidate reference images, as outlined below, in a manner that tends to offset the accumulated systematic displacement error, that will be within the scope of this invention.

Moreover, in this fourth exemplary, the location for each new reference image can be a next one of a set of predetermined or prescribed locations along the systematic displacement error curve. In this case, unlike the third exemplary embodiment, the locations in the set do not have to have equal but opposite systematic displacement errors. Rather, in this case, the sum of the systematic displacement errors for the set of predetermined locations equals zero. For example, as shown in the fourth accumulated systematic error curve 430, the locations along the systematic displacement error curve are spaced at 120 degrees from each other. In this case, the systematic displacement errors associated with those locations are not equal nor opposite. However, assuming that the replacement events are, on average, equally distributed between the three locations in the set, the accumulated systematic displacement error will tend to zero.

Figure 8:
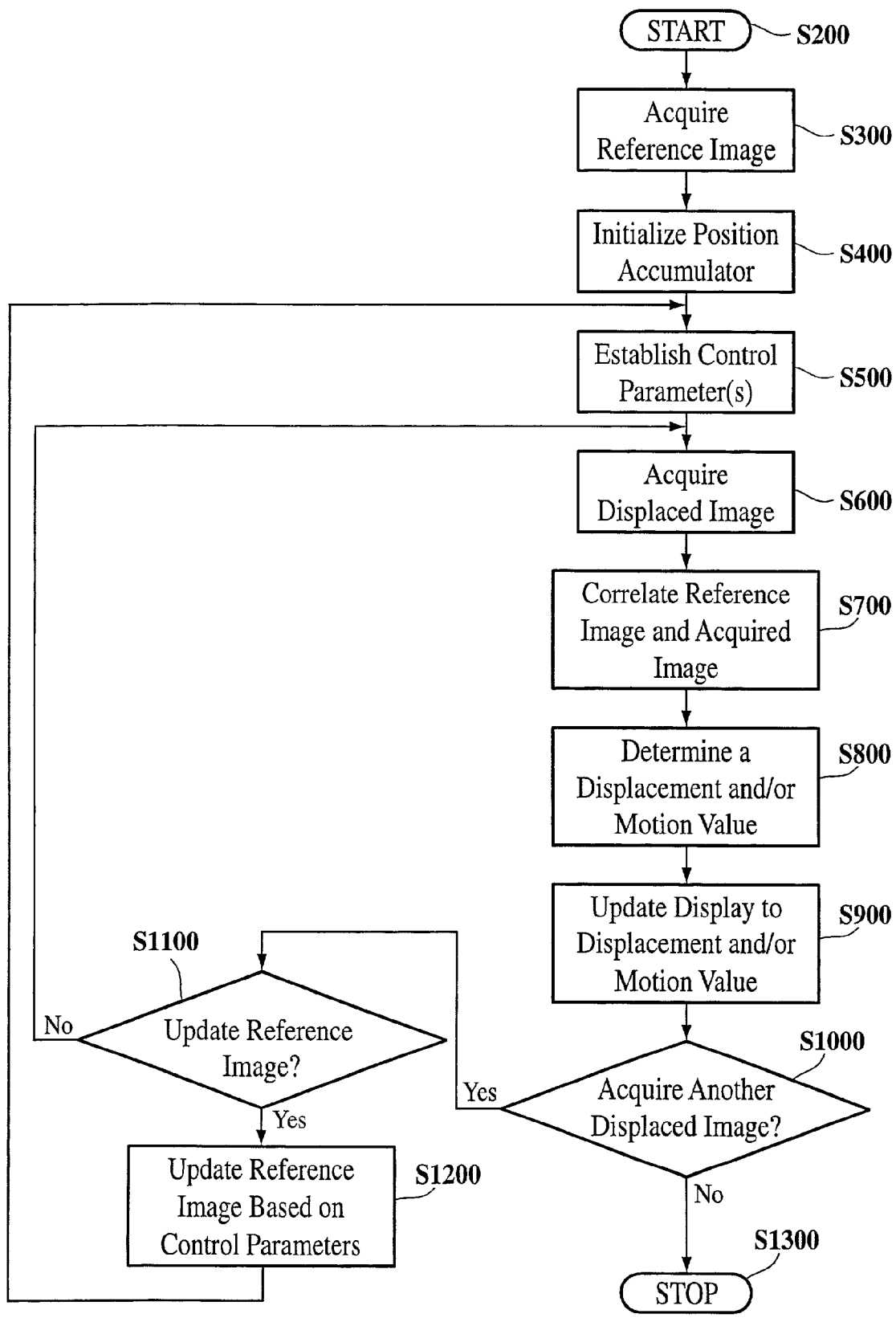
FIG. 8 is a flowchart outlining a first exemplary embodiment of a method for reducing accumulated systematic displacement errors according to this invention.

FIG. 8 is a flowchart outlining a first exemplary embodiment of a method for reducing accumulated systematic errors when updating reference images according to this invention. Beginning in step S200, control continues to step S300, where an initial reference image is acquired as the current reference image. Next, in step S400, a position accumulator is initialized and an initial displacement value is associated and stored for the initial reference image. Control then continues to step S500.

In general, this initial displacement value will be zero for the initial reference image. That is, the initial reference image represents the "zero" position of the readhead 126 relative to the optically rough surface 104. During operation, as each current reference image, such as the initial reference image, is replaced or updated with a new reference image, the offset or displacement of the new reference image relative to the old reference image will be added to the position accumulator. Because the position accumulator is not necessarily updated after each new displaced image is analyzed, the accumulated position error is reduced. Additionally, because the new reference image is selected according to the systems and methods according to this invention, the systematic displacement error between the current and new reference images is, in general, predictable.

This is true even if the actual systematic displacement error values are not known. That is, it is merely enough to know that the systematic displacement errors are periodic, the wavelength of the systematic displacement errors, the qualitative shape of the periodic systematic displacement errors and generally where within that wavelength any relative displacement between a current reference image and a displaced image is located. Thus, in such exemplary embodiments, the systematic displacement error need not be known to any particular degree of precision to be able to predict the qualitative nature of the systematic displacement error due to a particular relative displacement between the current and new reference images. Accordingly, when the systems and methods according to this invention are used, the position error that accumulates when one reference image is replaced with a new reference image can be further reduced or eliminated.

Furthermore, when the systems and method of this invention are used, such that the systematic displacement error between the current and new reference images is predictable, the accumulated systematic displacement error can either be compensated for, or the new reference images can be obtained in a manner such that the systematic displacement errors are self-compensating.

In step S500, one or more control parameters are established for the current reference image that determine when to begin looking for a displaced image that can be used to replace the current reference image as a new reference image. In general, the one or more control parameters determine when a displaced image, which can be either the current displaced image or a previously captured displaced image that has been saved, should be saved as the current reference image in place of the old reference image. The one or more control parameters will depend in part on one or more of the operating characteristics of the image-correlation-based displacement measuring system, such as, for example, the frame size, i.e., the size of the entire image captured by the light detector 160, and the array size, i.e., the size of the portions of the current displaced image and the reference image that are used in generating the correlation value, system timing and trigger signal characteristics, and the like and/or will depend in part on one or more aspects of the current operating state of the image-correlation-based displacement measuring system, such as, for example, the instantaneous speed, i.e., the rate of displacement, of the readhead 126 past the optically rough surface 104, the acceleration of the readhead 126 past the optically rough surface 104 and the like.

The one or more control parameters will also depend on the method used to determine when to capture or acquire the next displaced image. In general, there are two such methods, a fixed timing or sample rate method, and a controllable sample or timing rate method, although any other known or later developed method could be used in the systems and methods according to this invention. Regardless of the method used to determine when to acquire the next displaced image, the one or more control parameters establish one or more target values or ranges that ensure that the entire portion of the displaced image used to determine the correlation value remains within the frame of the reference image. That is, the array does not extend outside of the frame. A more detailed discussion of a process for establishing the one or more control parameters will be discussed below with reference to FIGS. 9–11.

Next, in step S600, a current displaced image is acquired. Then, in step S700, a correlation value is determined between the current reference image and the current displaced image. Control then proceeds to step S800.

As indicated above, there are generally two methods for determining when to acquire the current displaced image. In the first method, the sampling rate or timing is fixed. In this case, the displaced images are acquired at fixed time intervals, independent of the rate of displacement, i.e., the velocity or speed, of the readhead 126 relative to the optically rough surface 104. The velocity is generally the displacement between any two images and the total elapsed time between the capture of those two images.

In the second method, the sampling rate or timing is controllable. In general, the sampling timing will be controlled. In various exemplary embodiments, the sampling rate is controlled so that generally the same displacement occurs between successive displaced images based on the velocity of the readhead 126 relative to the optically rough surface 104. In various other exemplary embodiments, in addition to or alternatively to, controlling the sampling rate to obtain generally the same displacements, once the control parameters indicate that a new reference image should be identified, the sampling rate can be controlled on a different basis. For example, in some exemplary embodiments, in this case, the sampling rate will be increased to attempt to capture a displaced image having a displacement from the current reference image that is within a predetermined displacement relationship for the current reference image. However, it should be appreciated that the sampling rate or timing can be controlled in any desired manner and/or on any desired basis or parameter.

In step S800, a displacement and/or a motion value is determined based on the correlation determined in step S700. This displacement or motion value represents the current displacement of the current displaced image relative to the current reference image, regardless of any previous displacements of previous displaced images relative to the current reference image. Then in step S900, a display is updated to include the displacement and/or motion value determined in step S800. Next, in step S1000, a determination is made whether another displaced image needs to be acquired. If another displaced image needs to be acquired, then control proceeds to step S1100. Otherwise, control skips to step S1300, where the process stops.

In step S1100, a determination is made whether the reference image needs to be updated. If the reference image does not need to be updated, then control returns to step S600, and the process proceed as previously described. Otherwise, if the reference image does need to be updated, then control proceeds to step S1200, where the reference image is updated based on the one or more control parameters established in step S500. Control then returns to step S500, where new control parameters are established for the new current reference image. The process then proceeds as previously discussed.

In various exemplary embodiments, when the first, fixed sampling rate method is used, the displacement x of the displaced image relative to the current reference image can be used as the control parameter. When the first or second exemplary techniques are implemented, in various exemplary embodiments, the new reference image is selected from any displaced image that is displaced by L/3 to L/2 from the current reference image, where L is the frame length for the images. In contrast, when the third exemplary technique is implemented, in various exemplary embodiments, the new reference image is selected from any displaced image that continues to overlap the current reference image by at least "aM", where M is the size of the window along the direction of movement of the readhead 126 relative to the optically rough surface 104, and a is a constant at least equal to 1. In various exemplary embodiments, a is determined based on the fixed sampling rate.

On the object plane, the frame length L' is equal to the product of the pixel pitch and the number of pixels along the direction of motion, divided by the magnification of the optical system. Since the sampling rate is fixed, it is possible to continuously determine and update the velocity V(i) of the readhead 126 relative to the optically rough surface 104 between the last two displaced images i:

$$V(i)=x(i)-x(i-1) \quad (3)$$

where:

x(i) is the displacement of the current displaced image relative to the current reference image; and x(i−1) is the displacement of the immediately preceding displaced image relative to the current reference image.

Based on the last determined velocity V(i) of the readhead 126 relative to the optically rough surface 104 and the known sampling rate, it becomes possible to predict the range of subsequently acquired displaced images that will have a determined displacement relative to the current reference image that will fall within the allowed range of L/3 to L/2 relative to the current reference image, for the first and second exemplary technique, or the allowed range of aM, for the third exemplary technique. In particular, the time t from the present relative position x(i) to a displacement that lies between L/3 and L/2 relative to the current reference image is:

$$(L/3)-x(i)<V(i)t<(L/2)-x(i) \quad (4)$$

The time from the present position x(i) to a displacement that lies within the aM overlap region can be similarly determined.

The number N of displaced images that can be acquired before the time t from the present expires is thus given by t/T, where T is the sample time. Those N acquirable displaced images are, in various exemplary embodiments, stored in memory. For those last N sampled images, the sampled image that has a displacement relative to the current reference image that is closest to a half-integer pixel displacement (i.e., p/2, where p is the displacement corresponding to an integer number of pixels) is selected as the new reference image that is used to replace the current reference image. This is shown by the second exemplary accumulated displacement error curve 410 of FIG. 7. The other displaced images stored in the memory can be discarded.

In these exemplary embodiments, because, for each new reference image, that new reference image has a displacement relative to its current reference image of close to p/2, the systematic displacement errors will be clustered around the zero systematic displacement error point. Thus, the accumulated systematic displacement error should grow slowly, and will tend, if the systematic displacement errors are evenly distributed around the zero systematic displacement error point, to offset each other.

In various exemplary embodiments, after the first time the current reference image is replaced with a new current reference image selected as outlined above, the subsequent new current reference images are selected as outlined above, but with one additional criterion. This criterion is that the selected displaced image is the displaced image that both has a displacement that is closest to a half-integer pixel displacement and lies on the systematic error curve, such as that shown in FIG. 6, at a position that is on the opposite side of the zero error line than the position on the periodic error curve occupied by the current reference image.

In this case, when the new reference image is stored, and becomes the current reference image, the actual displacement from the previous reference image is also stored. Alternatively, only the estimated systematic displacement error, or the sign of the systematic displacement error, can be stored. Then, when the next new reference image is selected for the current reference image, that selected new reference image will have an actual displacement from the current reference image that is located on the systematic displacement error curve shown in FIG. 6 on the opposite side of the zero error line from the location of the actual displacement stored for the current reference image.

Alternatively, to accomplish the same result, the new reference image can be selected such that the sign of the systematic displacement error associated with the actual displacement for that new reference image is opposite to the sign of systematic displacement error associated with the current reference image. This will ensure that subsequent reference images have offsetting systematic displacement errors.

Alternatively, as outlined above with respect to the first accumulated systematic displacement error curve 400 of FIG. 7, the systematic displacement error associated with the position of the displacement of new reference image relative to the current reference image can be estimated from the systematic displacement error curve, such as that shown in FIG. 6. The estimated systematic displacement error can then be accumulated. The accumulated estimated systematic displacement error can then be subtracted from the accumulated displacement to obtain a systematic-displacement-error-compensated accumulated displacement. This will ensure that subsequent reference images have offsetting systematic displacement errors.

It should be appreciated that other, more complicated, methods that accumulate the reference position error and that selected a displaced image as the new current reference image in a manner that continuously minimizes the accumulated reference position error can be used, such as those outlined above with respect to the fourth accumulated systematic displacement error curve 430 of FIG. 7. This can be particularly useful when the velocity V(i) of the readhead 126 relative to the optically rough surface 104 is relatively high, such that the number N of displaced images that can be acquired as outlined above after the new current reference image has been selected approaches one.

In the exemplary embodiment outlined above, the acquired displaced image that has a displacement x that is closest to a half-integer pixel displacement is selected as the new current reference image. In contrast, in various other exemplary embodiments, as outlined above with respect to the first and third accumulated systematic displacement error curves 400 and 420 of FIG. 7, the selected displaced image is that displaced image that has a displacement x that is closest to a displacement of $(2p-1)/4$, where p is the displacement corresponding to an integer number of pixels. In this case, the displacement x of the selected displaced image relative to the current reference image will be an odd quarter-integer pixel displacement, i.e., one of $(p/4, 3p/4, 5p/4, \ldots)$.

In contrast to the exemplary embodiments outlined above, in these exemplary embodiments, the systematic displacement errors will tend to be clustered around either a maximum systematic displacement error or a minimum systematic displacement error. These minimum and maximum systematic displacement errors will tend to have the same absolute value. Thus, like the exemplary embodiments outlined above, if the systematic displacements are evenly distributed between the minimum and maximum systematic displacement error, they will offset each other, such that the net accumulated systematic displacement error tends towards zero.

In the previously exemplary embodiments, the new reference image is selected to have a displacement of $p/2$. While the values of the systematic displacement errors for these reference images are smaller than those for the latter exemplary embodiments, the values of the systematic displacement errors in the previous exemplary embodiments tend to be much more sensitive to the actual displacement. Thus, small changes in the actual displacement can result in large differences in the systematic displacement error. In contrast, in the latter exemplary embodiments, the systematic displacement errors tend to be fairly insensitive to the actual displacement. As a result, even actual displacements that differ by a relatively great amount have substantially the same systematic displacement error, except perhaps for the sign.

Thus, in various exemplary embodiments, as outlined above with respect to the first accumulated systematic displacement error curve 400, because the systematic displacement error is so sufficiently predictable, the systematic displacement error can be accumulated as outlined above and subtracted from the accumulated displacement to obtain a highly accurate compensated displacement. Furthermore, the value of the accumulated systematic displacement error can be reduced to close to zero by subtracting a multiple of the absolute value of the average systematic displacement error of the $(2p-1)/4$ positions that is closest to the absolute value of the accumulated systematic displacement error from that value.

In various other embodiments, similarly to the alternative exemplary embodiments described above with respect to the $p/2$ displacements, and as outlined above with respect to the third accumulated systematic displacement error curve 430, the new reference images in these $(2p-1)/4$ embodiments can be selected so that the sign of the systematic displacement error for the new reference image relative to the current reference image is opposite to that for the current reference image relative to the previous reference image.

In particular, in these exemplary embodiments, a displacement of $(4p-3)/4$ will be used to select the new current reference image when the current reference image was selected using a displacement of $(4p-1)/4$. In contrast, a displacement of $(4p-1)/4$ will be used to select the new current reference image when the current reference image was selected using a displacement of $(4p-3)/4$. In this case, the displacements x of successive selected displaced images relative to the current reference image will only be odd quarter-integer pixel displacements, but will alternate between the peaks and valleys of the periodic error curve shown in FIG. 6. That is, the displacements x of successive selected displaced images will alternate from being one of $(p/4, 5p/4, 9p/4, \ldots)$ to being one of $(3p/4, 7p/4, 11p/4, \ldots)$.

In general, the current reference image will need to be updated or replaced with a new reference image when the values of the one or more control parameters for the current displaced image exceed the tolerance values of the one or more control parameters determined for the current reference image. Depending on the method used to determine when to acquire the next displaced image, different types of control parameters will be used. In general, these control parameters will have reasonable tolerances associated with them to establish a target range for each control parameter for the current reference image. When the control parameter values of the current displaced image for one or more of the one or more control parameters are within the corresponding target range, the current reference image will need to be replaced with a new reference image.

For example, when the first method is used, the control parameter values include target displacement values for each direction the readhead 126 can move relative to the optically rough surface 104. When the readhead 126 can move only one-dimensionally relative to the optically rough surface 104, the target displacement values are positive and negative displacements along that linear dimension. In contrast, when the second method is used, the control parameter values include target sample time values that correspond to capturing a displaced image that should have a displacement that would be outside target displacement values.

It should be appreciated that there are a number of methods that can be used to provide the pool of potential displaced images from which the new current reference image can be selected. These methods are independent of the methods for determining when to acquire the displaced images discussed above. In a first method for providing this pool of potential displaced images, as each new displaced image is acquired and its displacement from the reference position of the current reference image is determined, the one or more control parameter values for that current displaced image are compared to the target ranges for the one or more control parameter for the current reference image. As soon as this comparison indicates that the at least one of the one or more control parameter values are within the corresponding target range for the current reference image, the current reference image is replaced with the current displaced image.

In a second method for providing this pool of potential displaced images, as soon as the comparison for the current displaced image indicates that at least one of the one or more control parameter values for the current displaced image are within the corresponding target range, the current displaced image, along with the displacement value for that displaced image, is stored in memory. Then, each subsequent displaced image is acquired and analyzed to determine the displacement and the one or more control parameter values for that subsequent displaced image. If the values of the one or more control parameters for that subsequent displaced image are also within the corresponding target ranges, the one or more control parameter values and/or the displacement for that subsequent image are compared to the one or more control parameters and/or the displacement for the currently saved displaced image to determine which displaced image is the "best candidate" to replace the current reference image. The "best candidate" displaced image is then saved. This continues until the subsequent displaced image has at least one of the one or more control parameters that has a value that is not within the corresponding target range. At that time, the current reference image is replaced with the saved displaced image.

With respect to the second method for determining when to acquire the displaced images that uses controllable sample rates, one way to control the sample rates is to use a "burst rate" mode, once one displaced image has at least one control parameter value that falls within the corresponding target range. In this burst rate mode, a number of displaced images are taken at a very high rate. This high rate is generally limited only by the time period required to read out all of the image values from the array 166 and to save the image values in memory. The number of displaced images is generally limited only by the available memory. However, since there is no value to a displaced image having at least one control parameter having a value that does not fall within the corresponding target range, the number of displaced images to be acquired during the burst mode can be practically limited by estimating when the actual or expected velocity of the readhead 126 relative to the optically rough surface will take the displaced images out of the at least one of the target ranges of the one or more control parameters.

Of course, it should be appreciated that, depending on the velocity of the readhead 126 relative to the optically rough surface 104, only one such displaced image may have control parameter values for the one or more control parameters that fall within the target ranges. It should also be appreciated that this second method takes additional memory.

In a third method for providing this pool of potential displaced images, the analysis of the best candidate can be delayed until after a subsequent displaced image has a value for at least one of the one or more control parameters that does not fall within the corresponding target range. In this case, each subsequent displaced image that does have control parameter values that fall within the corresponding target ranges are saved. It should be appreciated that this third method will take additional memory over the second method.

In a fourth method, the "best candidate" saved displaced image is used to replace the current reference image only if the one or more control parameters for the current subsequent image fall outside of the corresponding target ranges due to the subsequent image becoming less aligned with the current reference image. That is, if one or more of the control parameter values for the one or more control parameters of the current subsequent image fall outside of the corresponding target range because the displacement of the current subsequent image is less than the displacement that corresponds to the control parameters of the current displaced image falling within the corresponding target values, there is no need to update the current reference image. In this case, the one or more saved displaced images are discarded.

There are also a number of methods for determining the target range. In general, the target values for the control parameters represent the geometrical limit at which the array of the displaced image no longer fully lies within the frame of the current reference image (yes). These nominal target values are modified to form the target ranges by adding a buffer zone to each target value. In a first method, this buffer zone is determined based on a predetermined maximum value for the velocity of the readhead 126 relative to the optically rough surface 104. In a second method, this buffer zone is determined based on a determined actual velocity of the readhead 126 relative to the optically rough surface 104. It should be appreciated that, in this second method, the actual acceleration of the readhead 126 relative to the optically rough surface 104 can also be used to determine the buffer zone.

It should also be appreciated that the target range for each of the one or more control parameters may also be determined based on tolerances for the control parameter values. For example, for the first method for determining when to acquire the displaced images that use fixed sample rates or timing, dynamic tolerances can be based on the expected velocity of the readhead 126 relative to the optically rough surface 104 and/or the sample rate or timing.

Figure 9:
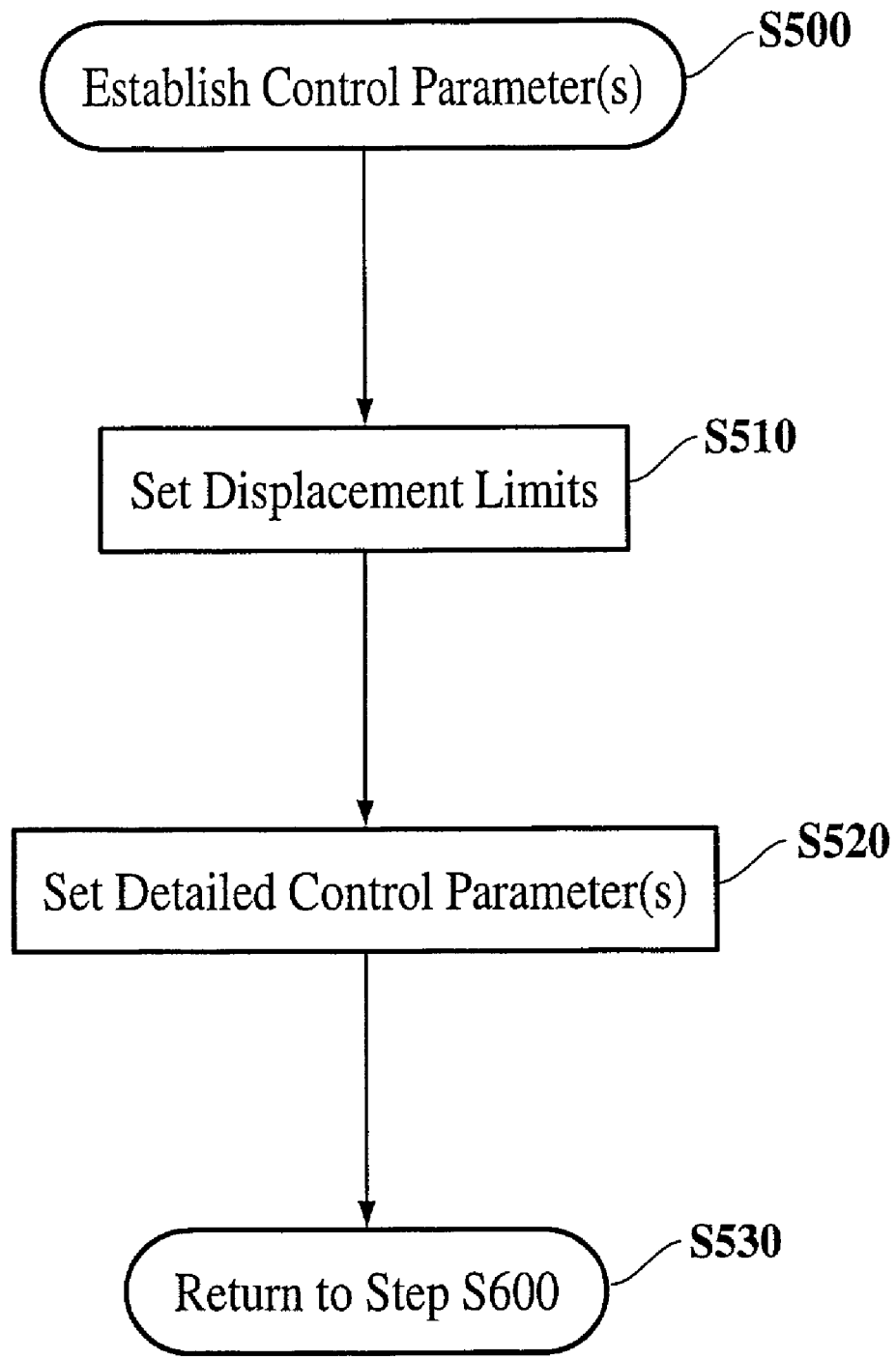
FIG. 9 is a flowchart outlining in greater detail one exemplary embodiment of a method for establishing control parameters according to this invention.

FIG. 9 is a flowchart outlining in greater detail an exemplary embodiment of a process for establishing one or more control parameters according to this invention. The one or more control parameters are established for the next reference image update. After beginning in step S500, control proceeds to step S510, where displacement limits are established relative to the current reference image, to ensure that the portion, or array, of the current displaced image remains within the frame of the current reference image. The displacement limits can be established, for example, by a maximum velocity buffer zone added to geometric limits of the array size. Further, the limits can be established, for example, by an actual velocity buffer zone added to geometric limits on the array size. Next, in step S520, the detailed control parameters are set so that the reference updating process will proceed in accordance with the various modes discussed above. Control then proceeds to step S530, where control returns to step S600.

Figure 10:
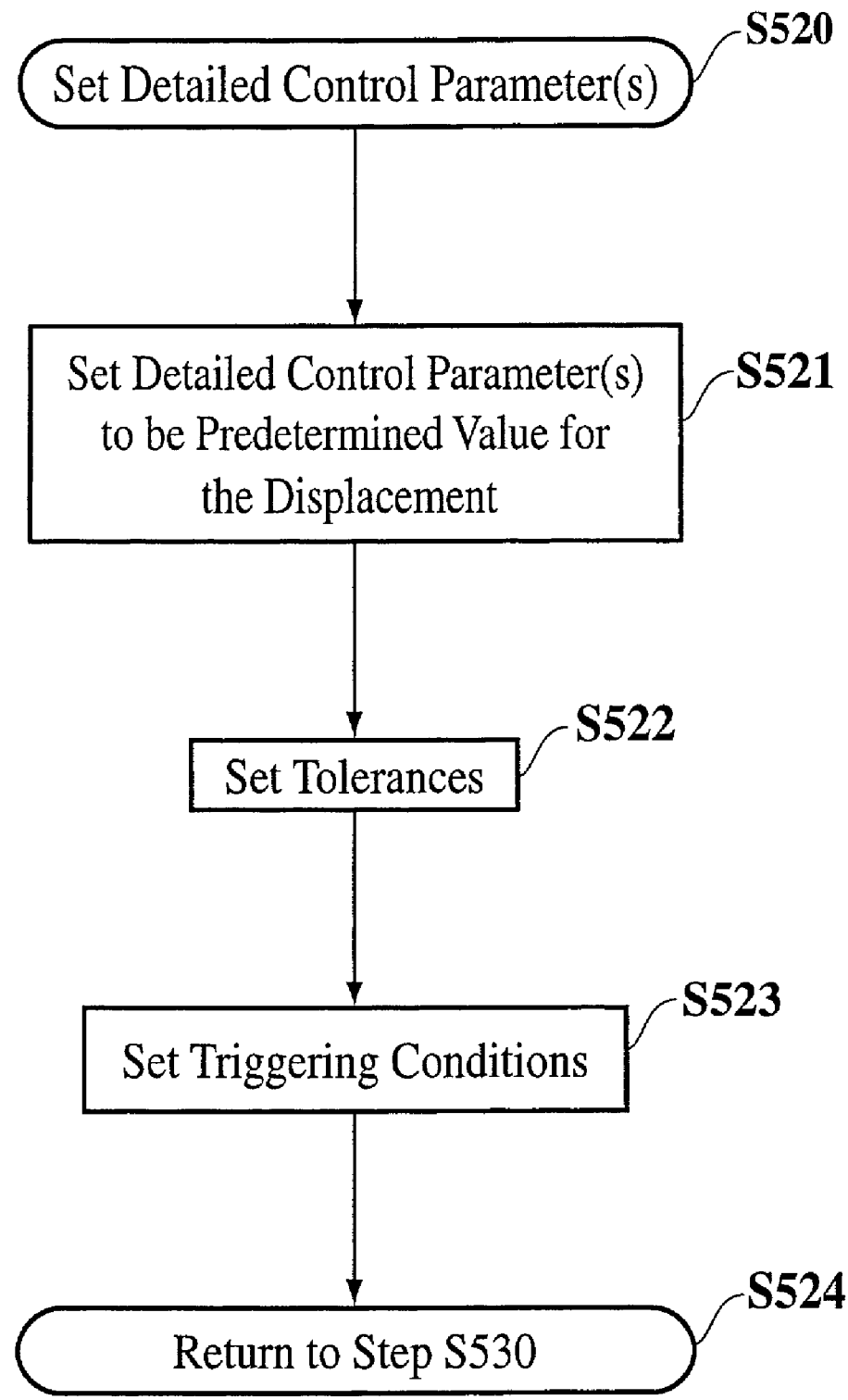
FIG. 10 is a flowchart outlining in greater detail a first exemplary embodiment of a method of setting detailed control parameters according to this invention.

FIG. 10 is a flowchart outlining in greater detail a first exemplary embodiment of a method for setting the detailed control parameters according to this invention. The process shown in FIG. 10 is an exemplary embodiment of the method for setting the detailed control parameters when a fixed sample or timing rate is used. After beginning in step S520, control proceeds to step S521, where the one or more control parameters are set. Here, for example, the target values for the one or more control parameters can be set. These target values correspond to one or more predetermined values for the displacement.

Next, in step S522, one or more tolerance values and/or buffer zone values are determined to establish the target ranges for the one or more control parameters. When setting the one or more target values, the tolerance and/or buffer zone values can be dynamically determined based on expected velocities and/or sample rates. By establishing the target values and tolerance and/or buffer zone values for the one or more control parameters, the displaced image that has control parameter values for the one or more control parameters that correspond to the target values, plus or minus the tolerance and/or buffer zone values for each target value, will trigger the reference image being replaced with a new reference image.

Then, in step S523, conditions are set that trigger updating the reference image. As outlined above, depending on the actual velocity of the readhead 126 relative to the optically rough surface 104, there may be only one reference image with a displacement and/or with a control parameter value that falls within target range of the control parameters, or there may be several such reference images that satisfy the conditions. In step S523, for example, triggering the reference image update process can be set so that the first reference image that is within the target range will be used to update the current reference image. Alternatively, triggering the update can be set to use the "best candidate" displaced image that falls within the target range until a subsequent image falls outside of the target range. In this case, the final best candidate will be used as the updated reference image. By using the latter method, the "best candidate" will usually be the displaced image that is the closest to the ideal displacement value. Control then proceeds to step S524, where the program returns to step S530.

Figure 11:
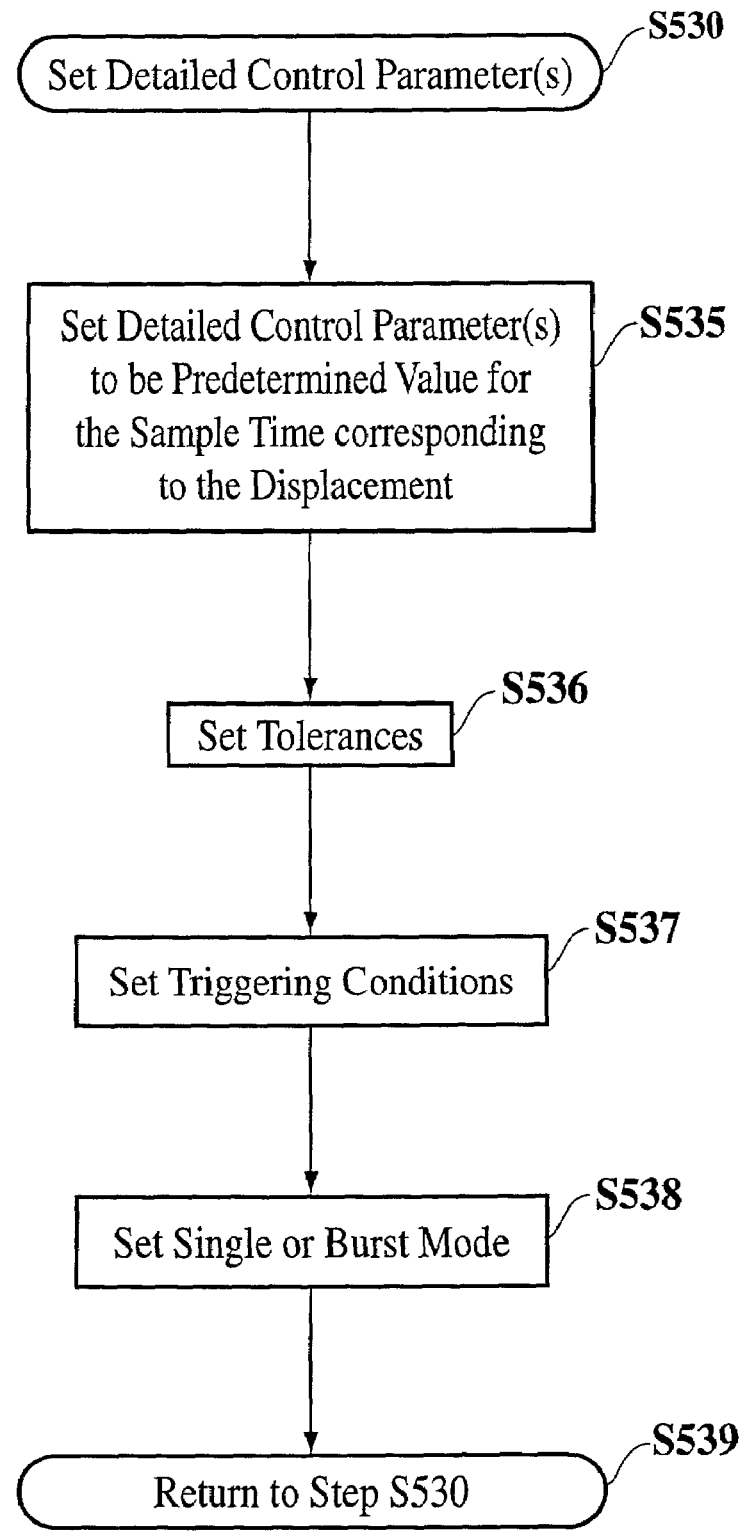
FIG. 11 is a flowchart outlining in greater detail a second exemplary embodiment of a method for setting detailed control parameters according to this invention.

FIG. 11 is a flowchart outlining in greater detail a second exemplary embodiment of a method for setting detailed control parameters according to this invention. The process shown in FIG. 11 is an exemplary embodiment of the method for setting the detailed control parameters when a controllable, or variable, sample rate is used.

After beginning in step S520, control proceeds to step S525, where the one or more control parameters are set. Here, for example, the target values for the one or more control parameters can be set to correspond to a predetermined value for the sample time. Next, in step S526, one or more tolerance values and/or buffer zone values are determined to establish the target ranges for the one or more control parameters. When setting the one or more target values, the tolerance and/or buffer zone values can be dynamically determined based on expected velocities and/or sample rates. By establishing the target values and tolerance and/or buffer zone values for the one or more control parameters, the displaced image that has control parameter values for the one or more control parameters that correspond to the target values, plus or minus the tolerance and/or buffer zone values for each target value, will trigger the reference image being replaced with a new reference image.

Next, in step S527, conditions are set that trigger updating the reference image. As outlined above, depending on the actual velocity of the readhead 126 relative to the optically rough surface 104, there may be only one reference image with a displacement and/or with a control parameter value that falls within target range of the control parameters, or there may be several such reference images that satisfy the conditions. In step S527, for example, triggering the reference image update process can be set so that the first reference image that is within the target range will be used to update the current reference image. Alternatively, triggering the update can be set to use the "best candidate" displaced image that falls within the target range until a subsequent image falls outside of the target range. In this case, in the final best candidate will be used as the updated reference image. By using the latter method, the "best candidate" will usually be the displaced image that is the closest to the ideal displacement value. Control then continues to step S528.

In step S528, the standard sample rate mode or the burst rate mode, as outlined above, is set. Then, in step S529, control returns to step S530.

Figure 12:
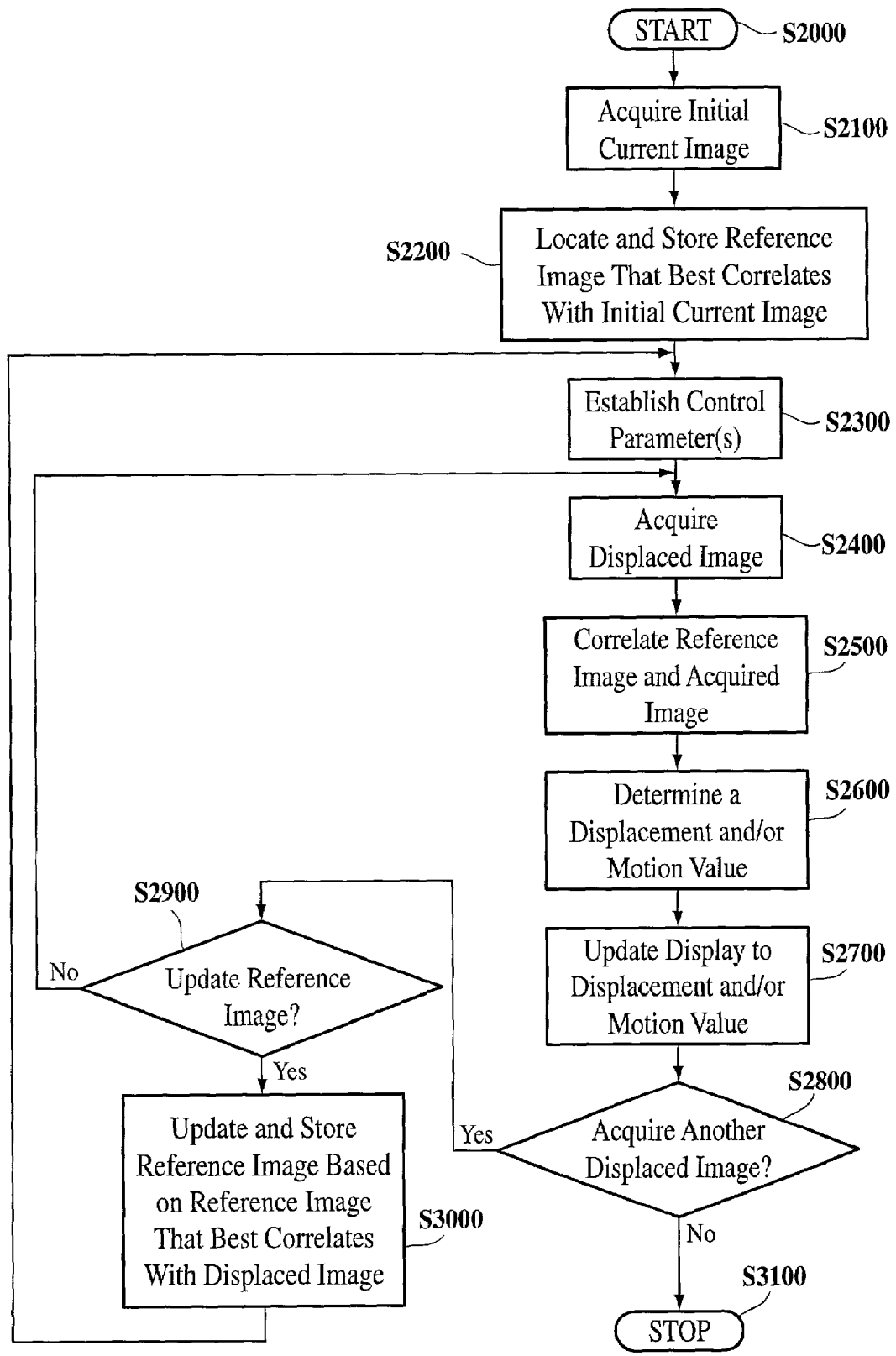
FIG. 12 is a flowchart outlining a second exemplary embodiment of a method for reducing accumulated systematic errors according to this invention.

FIG. 12 is a flowchart outlining a second exemplary embodiment of a method for reducing accumulated systematic errors according to this invention. The process in FIG. 12 can be ideally used in a situation where a given transducer is likely to exhibit repeating speckle images for a certain position. In the method outlined in FIG. 12, a series of reference images have previously been acquired and stored. These references images are generally equally spaced out along the entire extent of the optically rough surface 104 and have known position offsets relative to a defined point on the optically rough surface 104. In general, these known position offsets are accurately determined and thus have generally small position errors.

It should be appreciated that these stored references images can be acquired in any of a variety of methods, including the methods outlined above with respect to FIGS. 8–11. These stored references images can be acquired during manufacturing the transducer 100. In this case, the stored references images can be obtained during manufacture as outlined in FIGS. 8–11 while the readhead 126 is moved at a constant rate across the extent of the optically rough surface 104 from the defined point. Alternatively, the stored reference images can be acquired by a user, by placing the transducer 100 in a set-up mode. The user then moves the readhead 126 over the extent of the optically rough surface 104 from the defined point as the successive reference images that update a previous reference image are acquired according to this invention and stored in turn, along with the accumulated position from the defined point for each such subsequent reference image.

Thus, as shown in FIG. 12, beginning in step S2000, control continues to step S2100, where, upon turning on the power to the transducer, an initial current displaced image is acquired. Then, in step S2200, the stored references images are analyzed in turn to locate the reference image that best correlates with the initial current displaced image. Next, in step S2300, control parameters are established for the located, or current, reference image as outlined above with respect to FIGS. 8–11. Control then continues to step S2400.

In step S2400, a displaced image is acquired. Then, in step S2500, a correlation is determined between the current reference image and the displaced image acquired in step S2400. Next, in step S2600, a displacement and/or a motion value is determined based on the correlation determined in step S2500. Control then proceeds to step S2700.

In step S2700, a display is updated to include the displacement and/or a motion value determined in step S2600. Next, in step S2800, a determination is made whether another image needs to be acquired. If another image needs to be acquired, then control proceeds to step S2900. Otherwise, control skips to step S3100, where the process ends.

In step S2900, a determination is made whether a different reference image needs to be selected as the current reference image. If a different reference image does not need to be selected, then control returns to step S2400, and the process proceeds as previously described. Otherwise, if a different reference image does need to be selected, then control proceeds to step S3000, where the new reference image is determined.

In step S3000, the reference image can be updated, for example, by comparing the current displaced image to the stored reference images that are positioned on either side of the current reference image. Alternatively, in step S3000, the new reference image can be selected by using the current position velocity and/or acceleration to estimate the reference image that corresponds to the next expected displaced image position. In this example, system velocities can be tracked incrementally by an image correlation processing rate. After the new reference image has been selected, control then returns to step S2300, where new control parameters are established.

Figure 13:
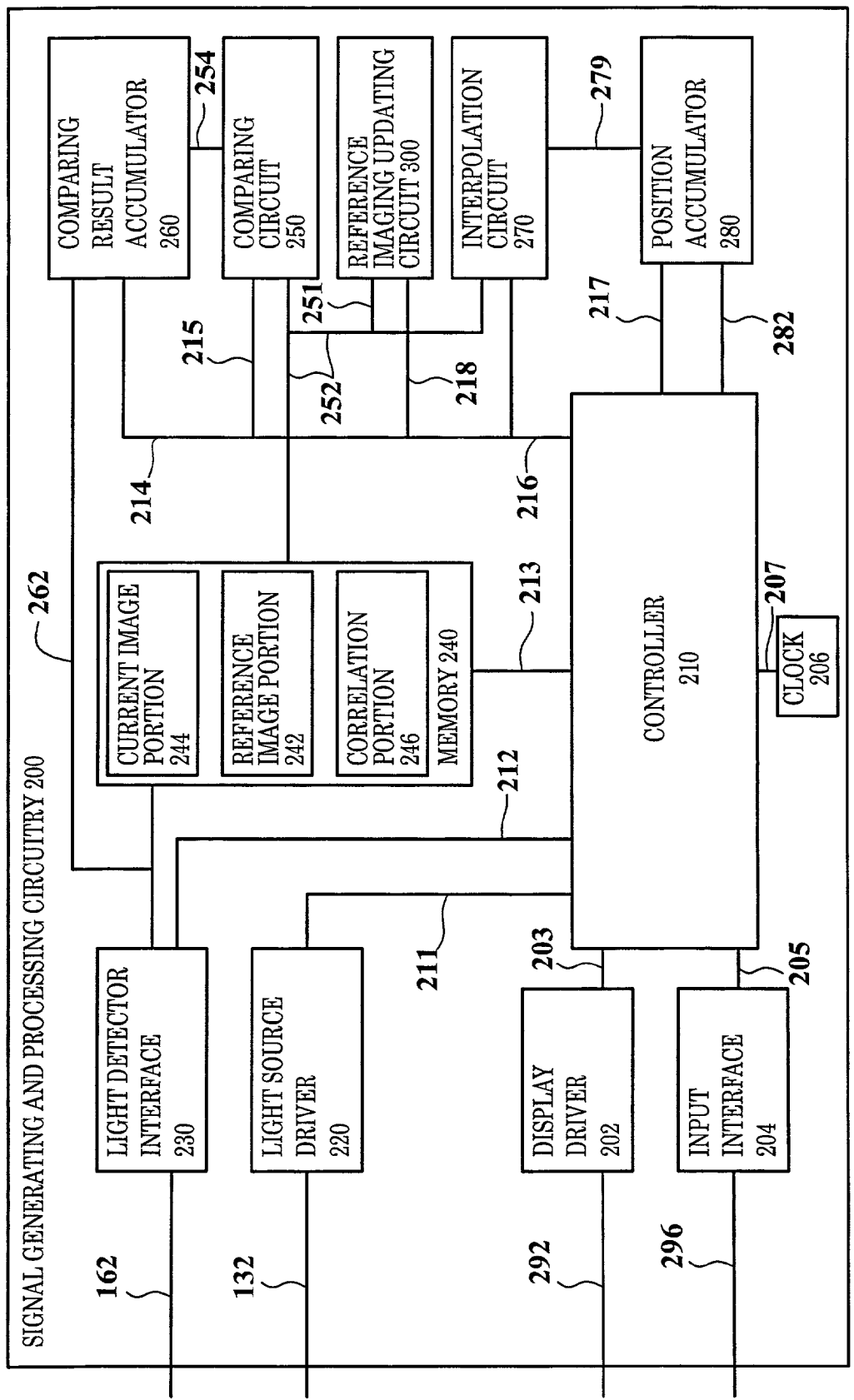
FIG. 13 is a block diagram outlining one exemplary embodiment of a signal generating and processing circuitry of an image-based optical position transducer suitable for providing images and for determining image displacements according to this invention.

FIG. 13 is a block diagram outlining in greater detail one exemplary embodiment of the signal generating and processing circuitry 200 shown in FIG. 1. As shown in FIG. 13, the signal generating and processing circuitry 200 includes a controller 210, a light source driver 220, a light detector interface 230, a memory 240, a comparing circuit 250, a comparison result accumulator 260, an interpolation circuit 270, a position accumulator 280, a display driver 202, an optional input interface 204, a clock 206 and a reference image updating circuit 300.

The controller 210 is connected to the light source driver 220 by a signal line 211, to the image detector interface 230 by a signal line 212, and to the memory 240 by a signal line 213. Similarly, the controller 210 is connected by signal lines 214–218 to the comparing circuit 250, the comparison result accumulator 260, the interpolation circuit 270, the position accumulator 280, and the reference image updating circuit 300, respectively. Finally, the controller 210 is connected to the display driver 202 by a control line 203 and, if provided, to the input interface 204 by a signal line 205. The memory 240 includes a reference image portion 242, a current image portion 244 and a correlation portion 246.

In operation, the controller 210 outputs a control signal over the signal line 211 to the light source driver 220. In response, the light source driver 220 outputs a drive signal to the light source 130 over the signal line 132. Subsequently, the controller 210 outputs a control signal to the image detector interface 230 and to the memory 240 over the signal lines 212 and 213 to store the signal portions received over the signal line 164 from the light detector 160 corresponding to each of the image elements 162 into the current image portion 244. In particular, the image values from the individual image elements 162 are stored in a two-dimensional array in the current image portion 244 corresponding to the positions of the individual image elements 162 in the array 166.

When the transducer is initially powered, the components within the signal generating and processing circuitry 200 operate in preparation for image correlation by storing the initial reference image. Within the signal generating and processing circuitry 200, the reference imaging updating circuit 300 awaits commands from the controller 210 in order to facilitate the reference updating process.

When stored reference images are not used, an initial image is acquired and becomes the initial reference image. Thus, this image is stored into the reference image portion 242. The displacement of the initial reference image from the defined point is also stored in the reference image portion 242. In contrast, when the stored reference images method is used, the initial image is stored into the current image portion 244. The stored reference image that bests correlates with that initial image is then located and copied into the reference image portion 242. An initial displacement value of zero is then stored in the reference image portion 242.

The reference image updating circuit 300 then determines one or more control parameters for the current reference image stored in the reference image portion 242. In some exemplary embodiments, the one or more control parameters to be used by the reference image updating circuit 300 are fixed, and/or are determined dynamically for each displaced image. On such dynamically determined control parameter is the current relative velocity of the readhead 126 past the optically rough surface 126. In other exemplary embodiments, the reference image updating circuit 300 will determine the target values for one or more of the control parameters for the initial reference image as outlined above with respect to FIGS. 9 and 10 or 11. The target values for the one or more control parameters are then stored with the initial reference image in the reference image portion 242.

Once an image is stored in the reference image portion 242, the controller 210 waits the appropriate fixed or controlled time period before outputting the control signal on the signal line 211 to the light source driver 220 to drive the light source 130. The image detector interface 230 and the memory 240 are then controlled using signals on the signal lines 212 and 213 to store the resulting image in the current image portion 244.

Then, the controller 210 outputs a signal on the signal line 214 to the comparing circuit 250. In response, the comparing circuit 250 inputs an image value for a particular pixel from the reference image portion 242 over a signal line 252 and inputs the image value for the corresponding pixel, based on the current offset, from the current image portion 244 over the signal line 252. The comparing circuit 250 then applies a correlation algorithm to determine a comparison result. Any appropriate correlation technique, either known or later-developed, can be used by the comparing circuit 250 to compare the reference image stored in the reference image portion 242 with the current image stored in the current image portion 244 on a pixel-by-pixel basis based on the current offset. The comparing circuit 250 outputs the comparison result on a signal line 254 to the comparison result accumulator 260 for the current correlation offset.

Once the comparing circuit 250 has extracted and compared the image value for each of the image elements 162 from the reference image portion 242 and compared them to the corresponding image values stored in the current image portion 244, and applied the correlation technique and output the comparison result to the comparison result accumulator 260, the value stored in the comparison result accumulator 260 defines the correlation value, corresponding to the current offset, in predetermined units. The controller 210 then outputs a signal over the signal line 215 to the comparison result accumulator 260 and to the memory 240 over the signal line 213. As a result, the correlation algorithm result stored in the comparison result accumulator 260 is output and stored in the correlation portion 246 of the memory 240 at a location corresponding to the current offset.

The controller 210 then outputs a signal on the signal line 215 to clear the result accumulator 260. Once all of the comparisons for all of the desired offsets between the first image stored in the reference image portion 242 and the displaced image stored in the current image portion 244 have been performed by the comparing circuit 250, and the results accumulated by the comparison result accumulator 260 and stored in the correlation portion 246 under control of the controller 210, the controller 210 outputs a control signal over the signal line 216 to the interpolation circuit 270.

In response, the interpolation circuit 270 inputs the correlation results stored in the correlation portion 246 over the signal line 252, and identifies correlation values coinciding with a peak or trough of the correlation function and interpolates between the identified correlation function value points in the vicinity of the peak/trough of the correlation function to determine the peak offset value or image displacement value with sub-pixel resolution. The interpolation circuit 270 then outputs, under control of the signal over the signal line 216 from the controller 210, the determined estimated sub-pixel displacement value on a signal line 279 to the position accumulator 280. The position accumulator 280, under control of the signal over the signal line 217 from the controller 210, adds the estimated displacement value to the displacement value for the current reference image stored in the reference image portion. The position accumulator 280 then outputs the updated position displacement to the controller 210 over the signal line 282.

In response, the controller 210 may output the updated displacement value to the display driver 202, if provided, over the signal line 218. The display driver 202 then outputs drive signals over the signal line 292 to the display device 107 to display the current displacement value.

The reference image updating circuit 300 updates a current reference image with a new reference image based on the values for the one or more control parameters. For example, if the transducer 100 uses the fixed sample rate reference updating process, then the reference image updating circuit 300 will, in some exemplary embodiments, proceed with updating the reference image in accordance with the process shown in FIGS. 9 and 10. In contrast, if the transducer 100 uses the controlled sample rate reference updating process, the reference updating circuit will, in some exemplary embodiments, proceed with updating the reference image in accordance with the process shown in FIGS. 9 and 11.

One or more signal lines 205, if provided, allow an interface between an operator or a cooperating system and the controller 210. If provided, the input interface 204 may buffer or transform the input signals or commands and transmit the appropriate signal to the controller 210.

The operation of this system has been described with respect to reference and current images that are acquired within a short time period of each other, as previously stated. Because the images are acquired within a short period of time, the apparent displacement between the images is usually small. Thus, the computational time required to obtain the displacement of the images can be reduced. For example, by only computing the correlation function using only one pixel row, instead of each pixel row, an adequate approximate correlation peak can be obtained within the short period of time. Further, by subsequently calculating a reduced length correlation function using the remaining pixel rows, a total computational time can be additionally reduced.

However, in various other exemplary embodiments, as outlined above, it may be desirable to store a "permanent" reference image corresponding to a particular position for long time periods. For example, in some instances, a reduced computational time may not be a factor, and a reference image may need to be stored for a long duration for historical reasons. In this situation, the permanent reference image can be selected at any later time to be used as the current reference. For example, such an image might correspond to a reset, or "homing", position of a device. In this case, small deviations from the reset, or "homing", position can be detected at any later time, by comparing the permanent reference image to an image acquired at the later time.

Thus, it should be understood that, in various exemplary embodiments of the systems and methods according to this invention, images stored for long time periods may always be used in place of the first or second images, and compared to a current second or first image, when it is appropriate for the system application. Furthermore, many of the difficulties described above associated with acquiring a reference image precisely at a desired location can be overcome if a particular image-correlation-based displacement system is operated according to a prescribed procedure at a very slow rate of speed and stopped precisely at one or more desired locations in order to acquire one or more reference images at a desired spacing, i.e., a prescribed displacement. Such reference images, and the associated reference-class displacements, can then be stored and used during subsequent high-speed real-time operation, for example as taught in the previously-mentioned Japanese Patent Application JP 07069302 to Kamegawa.

Figure 14:
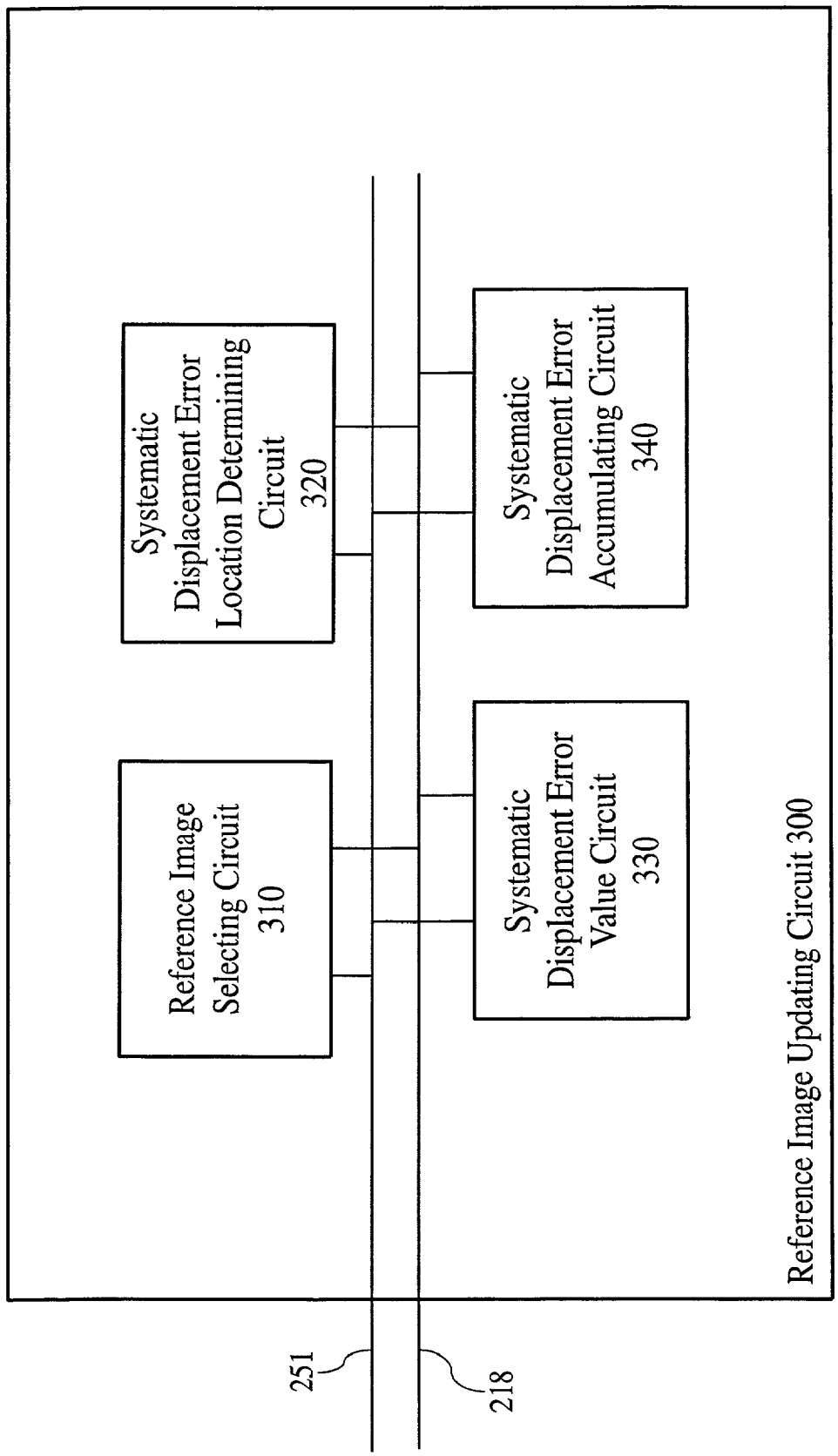
FIG. 14 is a block diagram outlining a first exemplary embodiment of the reference image updating circuit of FIG. 13 according to this invention.

FIG. 14 is a block diagram outlining a first exemplary embodiment of the reference image updating circuit 300 of FIG. 13 according to this invention. As shown in FIG. 14, the reference image updating circuit 300 includes a reference imaging selecting circuit 310, a systematic displacement error location determining circuit 320, a systematic displacement error value circuit 330 and a systematic displacement error accumulating circuit 340. The first exemplary embodiment of the reference image updating circuit 300 shown in FIG. 14 can also include a controllable sample rate circuit 380, and/or a displacement limit circuit 390, as discussed in greater detail below with respect to the second and third exemplary embodiments of the reference image updating circuit 300 shown in FIGS. 15 and 16.

Figure 15:
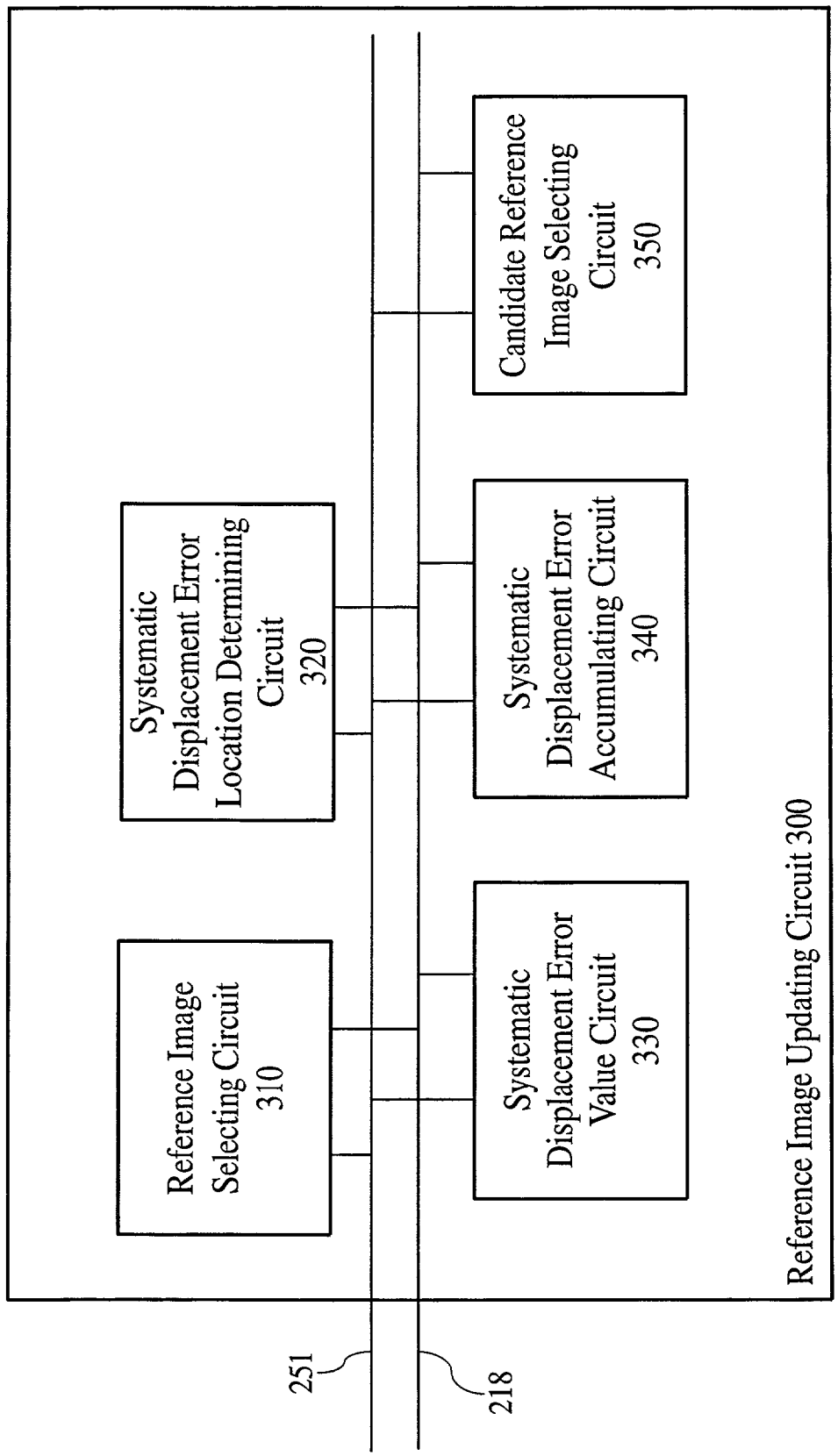
FIG. 15 is a block diagram outlining a second exemplary embodiment of the reference image updating circuit of FIG. 13 according to this invention.
Figure 16:
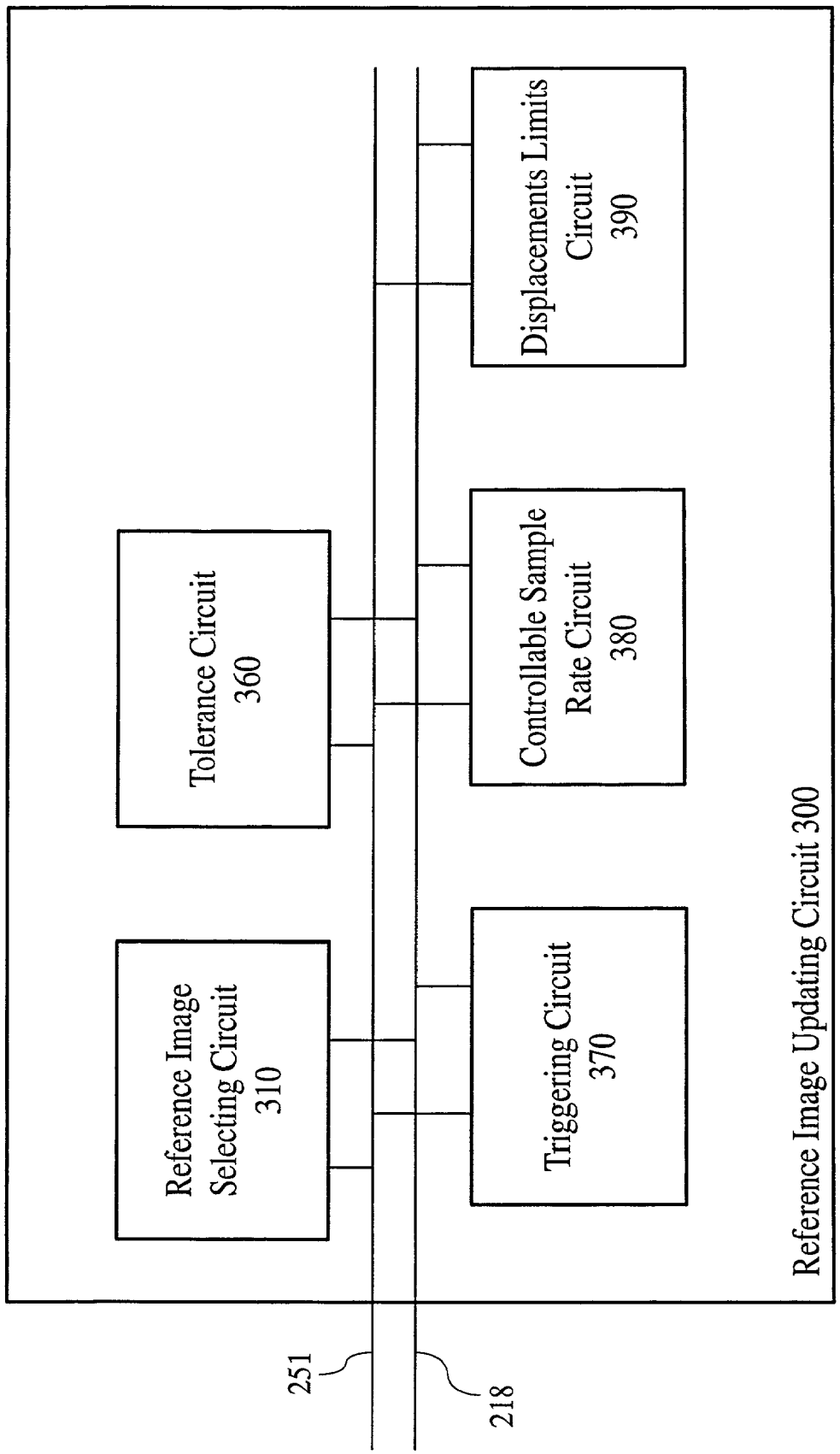
FIG. 16 is a block diagram outlining a third exemplary embodiment of the reference image updating circuit of FIG. 13 according to this invention.

In FIGS. 14–16, each of the circuits 310–390 of the reference image updating circuit 300 is connected to the signal lines 251 and 218. The signal line 251 connects the reference image updating circuit 300 to the memory 240 of the signal generating and processing circuitry 200. The signal line 218 connects the reference image updating circuit 300 to the controller 210.

The reference imaging selecting circuit 310 determines if the current acquired displaced image should be used to replace the current reference image based on one or more control parameters. These control parameters include the apparent displacement between the current reference image and the current acquired displaced image, and one or more of a minimum apparent displacement between the current reference image and the current acquired displaced image before the current acquired displaced image should be considered as a possible replacement for the current reference image, a maximum apparent displacement between the current reference image and the current acquired displaced image after which the current acquired displaced image should not be considered as a possible replacement for the current reference image, the relative velocity of the readhead 126 past the optically rough surface 104, as well as the other possible control parameters discussed above.

In this first exemplary embodiment, in general, a predetermined one, such as the first, the second or the like, of the acquired displaced images that the reference imaging selecting circuit 310 determines to be a candidate new reference image is selected as the new reference image. Next, the sub-pixel displacement determining circuit 320 determines the sub-pixel portion of the apparent displacement of the current displaced mage relative to the current reference image. It should be appreciated that, because the systematic error curve is periodic over the extent of one pixel, the sub-pixel portion of the apparent displacement identifies the location along the systematic displacement error curve, even if the exact shape of the systematic error curve, and thus the systematic displacement error associated with that location is not known.

The systematic displacement error value circuit 330 then determines the systematic displacement error associated with a predetermined and stored systematic displacement error curve for the selected new reference image based on the determined sub-pixel displacement. This systematic displacement error curve is generally specific to each device containing a readhead 126 and an optically rough surface 104. This systematic displacement error curve is generally obtained and stored in the signal generating and processing circuitry 200 during manufacturing and/or assembly of the device. The systematic displacement error accumulating circuit 340 then adds this determined systematic displacement error for the new reference image to an accumulated systematic displacement error that has accumulated as each previous current reference image was replaced by a previous new reference image. The controller 210 uses this accumulated systematic displacement error to adjust the apparent total displacement of the readhead 126 relative to the optically rough surface 104 determined from the apparent displacements accumulated as each previous current reference image was replaced by a previous new reference image and the apparent displacement of the current displaced image relative to the current reference image.

FIG. 15 is a block diagram outlining a second exemplary embodiment of the reference image updating circuit 300 of FIG. 13 according to this invention. As shown in FIG. 14, the reference image updating circuit 300 includes the reference imaging selecting circuit 310, the sub-pixel displacement determining circuit 320, and a candidate reference image selecting circuit 350, and may optionally include the systematic displacement error value circuit 330 and the systematic displacement error accumulating circuit 340. The second exemplary embodiment of the reference image updating circuit 300 shown in FIG. 15 can also include the controllable sample rate circuit 380, and/or the displacement limit circuit 390, as discussed in greater detail below and with respect to the third exemplary embodiment of the reference image updating circuit 300 shown in FIG. 16.

In this second exemplary embodiment of the reference image updating circuit 300, the reference imaging selecting circuit 310 and the sub-pixel displacement determining circuit 320, and the systematic displacement error value circuit 330 and the systematic displacement error accumulating circuit 340, if included, generally operate as discussed above. Thus, except as discussed below, these circuits will not be described in detail. However, in this second exemplary embodiment, the reference imaging selecting circuit 310 does not merely use a predetermined one of the acquired displaced images as the new reference image. Rather, once the reference imaging selecting circuit 310 first determines that an acquired displaced reference image is a candidate reference image, based on the one or more control parameters, that first candidate image is stored as the current candidate reference image, along with one or more of the determined sub-pixel displacement for that candidate new reference image, and/or, if implemented, the systematic displacement error associated with the determined sub-pixel displacement.

Then, until the control parameters indicated that the current displaced image cannot be so used, for each subsequent acquired displaced image, that additional candidate image is stored, along with one or more of the determined sub-pixel displacement for that candidate new reference image, and/or, if implemented, the systematic displacement error associated with the determined sub-pixel displacement.

In some exemplary embodiments, as soon as each additional candidate image is acquired, the candidate reference image selecting circuit 350 selects one of the additional candidate image or the stored candidate new reference image, based on one or more of the control parameters, such as the sub-pixel displacement or the total accumulated systematic displacement error. The selected candidate is then stored as the current candidate reference image. This continues until the control parameters indicated that there are no further additional candidate images to be acquired. At that time, the reference imaging selecting circuit 310 identifies the current candidate image as the new reference image to the controller 210.

It should be appreciated that, in these exemplary embodiments, the controllable sample rate circuit 380 can be used as outlined below to control the sample time for a next displaced, i.e., candidate, image. In this case, it is likely that that candidate image will very closely match the selection criteria used by the reference imaging selecting circuit 310. It should also be appreciated that the displacement limit circuit 390 could be used, as outlined below with respect to FIG. 16, to determine that there are no further additional candidate images to be acquired.

In other exemplary embodiments, all of the additional candidate images are collected as stored. Then, once the control parameters indicated that there are no further additional candidate images to be acquired, the candidate reference image selecting circuit 350 selects one of the set of all of the additional candidate images and the current candidate image as the new reference image, as outlined above. At that time, the reference imaging selecting circuit 310 identifies the current candidate image as the new reference image to the controller 210.

It should be appreciated that, in these other exemplary embodiments, the controllable sample rate circuit 380 can be used as outlined below to rapidly generate a number of candidate images. In this case, it is likely that one of those candidate images will very closely match the selection criteria used by the reference imaging selecting circuit 310. It should also be appreciated that the displacement limit circuit 390 could be used, as outlined below with respect to FIG. 16, to determine that there are no further additional candidate images to be acquired.

FIG. 16 is a block diagram outlining a third exemplary embodiment of the reference image updating circuit 300 of FIG. 13 according to this invention. As shown in FIG. 14, the reference image updating circuit 300 includes a reference imaging selecting circuit 310, a tolerance circuit 360, a triggering circuit 370, a controllable sample rate circuit 380, and a displacement limit circuit 390.

In this third exemplary embodiment, in operation, to establish the target values for the one or more control parameters for updating the reference image, the controller 210 outputs a control signal over the signal lines 216 and 218 to the displacements limits circuit 390 of the reference image updating circuit 300. The displacement limits circuit 390 establishes displacements limits, relative to the current reference image, that ensure that the array of the current displaced image portion remains within the frame of the current reference image. The displacement limits can be established, for example, as a simple maximum velocity buffer zone added to geometric limits on the array, or as an actual velocity buffer zone that is added to the geometric limits on the array.

The controller 210 then sends a control signal to the tolerance circuit 360, where a tolerance is set to a value that corresponds to plus or minus the target value for the displacement where the corresponding image will still be used as the updated reference. For example, the tolerances in the tolerance circuit 360 can be dynamically determined based on expected or actual velocities and sample rates.

After the displacement value for the current displaced image is determined, the controller 210 outputs a control signal to the triggering circuit 370. In response, the triggering circuit 370 inputs the target values for the one or more control parameters for the current reference image from the reference image portion 242 and the values of the one or more control parameters for the current displaced image. Depending on the particular control parameters implemented, the values of the one or more control parameters for the current displaced image can be obtained from one or more of the circuits 210–280 of the signal generating and processing circuitry 200. Alternatively, or in addition, the triggering circuit 370 can itself determine one or more of the values for one or more of the control parameters for the current displaced image.

Once all of the target ranges and the values for the one or more control parameters are available to the triggering circuit 370, the triggering circuit 370 compares each control parameter value for the current reference image to the corresponding target range for that control parameter. Based on the comparison, the triggering circuit 370 determines whether the updating process implemented in the signal generating and processing circuitry 200 needs to be triggered. Depending on the particular updating method implemented in the signal processing and circuitry 200, the triggering circuit 370 will output the triggering signal to one or more of the controller 210 or the controllable sample rate circuit 380.

For example, if the single or immediate updating method, as described above, is implemented, the controller 210, in response to the triggering signal from the triggering circuit 370, copies the image data for the current displaced image started in the current image portion 244 to the current reference portion 242, along with the current displacement started in the position accumulator 280.

In contrast, if the best candidate method is implemented in the signal generating and processing circuitry 200, the controller 210, in response to the triggering signal from the triggering circuit 370, marks the current displaced image in the current image portion 244 so that it is saved along with the displacement started in the position accumulator 280. Then, after a next displaced image is acquired and analyzed, the controller 210 outputs a signal to the triggering circuit 370. In response, the triggering circuit 370 compares the control parameter values for the current best candidate displaced image and the current displaced image to determine which is the new best candidate displaced image. The triggering circuit 370 outputs a signal to the controller 210 indicating which of the two displaced images stored in the current image portion 244 should be retained as the current best candidate image along with its displacement value.

If the signal processing and generating circuitry 200 implements the controlled sampling rate method, the controllable sample rate circuit 380 determines a desired sample rate based on the values for the one or more control parameters of the current displaced image stored in the current image portion 244 and outputs the determined sample rate to the controller 210. In response, the controller 210 generates the control signal to the light source driver 220 based on the sample rate determined by the controllable sample rate circuit 380. Of course, it should be appreciated that, if the controlled sample rate method is not implemented, the sample rate circuit 380 can be omitted.

If the signal generating and processing circuitry 200 implements both the controlled sample rate and the burst mode method of obtaining the best candidate sampled image, the triggering circuit 370 outputs the triggering signal to the controllable sample rate circuit 380. In response, the controllable sample rate circuit 380 outputs a burst mode sample rate signal to the controller 210 that causes the controller 210 to operate the light source driver 220 and the other circuits 230–280 of the signal generating and processing circuitry 200 in a burst mode. In this case, each of the acquired displaced images during the burst mode is stored in the current image portion 240 along with the corresponding displacement.

The triggering circuit 370 continues to output the triggering signal to the controllable sample rate circuit 380 until the latest acquired displaced image no longer has all of the values for the one or more control parameters falling within the corresponding target ranges for the one or more control parameters. In response, the controllable sample rate circuit 380 outputs a signal to the controller 210 corresponding to a standard or default sample rate. At the same time, the triggering circuit 370 analyzes all of the stored displaced images to determine the best candidate displaced image to be used to replace the current reference image.

It should be appreciated that the reference image updating circuit 300 is not limited to these exemplary embodiments, but can take any form and include any circuit or software routine that allows any of the various techniques for accumulating the systematic displacement error in a known manner or for accumulating the systematic displacement error in a way that tends to reduce the amount of accumulated systematic displacement error over any number of replacement events, as outlined above with respect to FIG. 7, to be implemented.

The signal generating and processing circuitry 200 is, in various exemplary embodiments, implemented using a programmed microprocessor or microcontroller and peripheral integrated circuit elements. However, the signal generating and processing circuitry 200 can also be implemented using a programmed general purpose computer, a special purpose computer, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing any one or more of the methods outlined above can be used to implement the signal generating and processing circuitry 200.

In FIG. 13, the memory 240 in the signal generating and processing circuitry 200 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory, a memory stick or the like. Similarly, the non-alterable or fixed memory can be implemented using any one or more of ROM, PROM, EPROM, EEPROM, an optical ROM disk, such as a CD-ROM or DVD-ROM disk, and associated disk drive, or the like.

Thus, it should be understood that each of the controllers 210, and various other circuits 220, 230 and 250–280 of the signal generating and processing circuitry 200 and the various circuits 310–350 of the reference image updating circuit 300, as shown in FIGS. 13–16, can be implemented as portions of a suitably programmed general purpose computer, macroprocessor or microprocessor. Alternatively, each of the controller 210 and the other circuits 220, 230 and 250–280 and 310–350 shown in FIGS. 13–16 can be implemented as physically distinct hardware circuits within an ASIC, or using a FPGA, a PDL, a PLA or a PAL, or using discrete logic elements or discrete circuit elements. The particular form each of the circuits 220, 230, 250–280 of the signal generating and processing circuitry 200 and the particular form each of the circuits 310–350 of the reference image updating circuit 300 will take is a design choice and will be obvious and predicable to those skilled in the art.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for determining accumulated displacement in an image-correlation-based displacement measuring system, comprising:

determining at least one reference-class displacement between the two images of at least one corresponding reference-class image pair, the two images of a reference-class image pair comprising a first image and a second image, each reference-class displacement being determined to a sub-pixel resolution; and determining an accumulated displacement based at least partially on the at least one reference-class displacement;

wherein:

the at least one reference-class displacement is determined in a manner that at least partially rejects an accumulation of systematic displacement estimate errors that arise from an image-correlation error characteristic having a period corresponding to a pitch of a pixel spacing used to acquire the first and second images.

2. The method of claim 1, further comprising determining at least one additional displacement between the second image of a reference-class image pair and an additional image, wherein determining the accumulated displacement based at least partially on the at least one reference-class displacement comprises determining the accumulated displacement based at least partially on the at least one reference-class displacement and the at least one additional displacement.

3. The method of claim 1, wherein determining the reference-class displacement in a manner that at least partially rejects an accumulation of the systematic displacement estimate errors comprises determining the image that is used as the second image of the at least one corresponding reference-class image pair based on a prescribed displacement for the second image relative to the first image of the at least one corresponding reference-class image pair, and the prescribed displacement for the second image relative to the first image of at least one corresponding reference-class image pair comprises (n/2) pixels, where n is a positive integer at least equal to 1.

4. A method for determining accumulated displacement in an image-correlation-based displacement measuring system, comprising:

determining at least one reference-class displacement between the two images of at least one corresponding reference-class image pair, the two images of a reference-class image pair comprising a first image and a second image, each reference-class displacement being determined to a sub-pixel resolution; and determining an accumulated displacement based at least partially on the at least one reference-class displacement;

wherein:

the at least one reference-class displacement is determined in a manner that at least partially rejects an accumulation of systematic displacement estimate errors that arise from an image-correlation error characteristic having a period corresponding to a pitch of a pixel spacing used to acquire the first and second images; and the determining the reference-class displacement in a manner that at least partially rejects an accumulation of the systematic displacement estimate errors comprises determining the image that is used as the second image of the at least one corresponding reference-class image pair based on a prescribed displacement for the second image relative to the first image of the at least one corresponding reference-class image pair, wherein the prescribed displacement has a sub-pixel resolution and the second image of at least one reference-class image pair is used as the first image of a spatially-adjacent reference-class image pair.

5. The method of claim 4, wherein the prescribed displacement relative to the first image of at least one corresponding reference-class image pair comprises $(2n-1)/4$ pixels, where n is a positive integer at least equal to 1.

6. The method of claim 4, wherein, for at least two spatially-adjacent reference-class image pairs, the prescribed displacement relative to the first image of a first one of the two reference-class image pairs comprises $(4n-1)/4$ pixels and the prescribed displacement relative to the first image of a second one of the two reference-class image pairs comprises $(4o-3)/4$ pixels, where n and o are positive integers at least equal to 1.

7. The method of claim 4, wherein determining each respective image that is used as the second image of each at least one corresponding reference-class image pair based on a prescribed displacement comprises acquiring the second image of the at least one corresponding reference-class image pair as close as possible to the prescribed displacement, based on the operating characteristics and current operating state of the image-correlation-based displacement measuring system; and wherein, for at least two reference-class image pairs:

a difference is determined between the prescribed displacement corresponding to at least a first one of the at least two reference-class image pairs and an actual displacement corresponding to the at least first one of the at least two reference-class image pairs, and the prescribed displacement corresponding to at least a second one of the at least two reference-class image pairs is determined partly based on a pre-determined error characteristic of the image-correlation-based displacement measuring system and partly based on the difference determined for the at least first one of the at least two reference-class image pairs.

8. The method of claim 4, wherein determining each respective image that is used as the second image of the at least one corresponding reference-class image pair based on a prescribed displacement comprises selecting the image which is closest to the prescribed displacement from a set of at least two candidate images; and wherein, for at least two reference-class image pairs:
a difference is determined between the prescribed displacement corresponding to at least a first one of the at least two reference-class image pairs and an actual displacement corresponding to the at least first one of the at least two reference-class image pairs, and the prescribed displacement corresponding to at least a second one of the at least two reference-class image pairs is determined partly based on a pre-determined error characteristic of the image-correlation-based displacement measuring system and partly based on the difference determined for the at least first one of the at least two reference-class image pairs.

9. The method of claim 4, wherein determining each respective image that is used as the second image of the at least one corresponding reference-class image pair based on a prescribed displacement comprises acquiring the second image of the at least one corresponding reference-class image pair as close as possible to the prescribed displacement, based on the operating characteristics and current operating state of the image-correlation-based displacement measuring system.

10. The method of claim 9, wherein acquiring the second image of the at least one corresponding reference-class image pair as close as possible to the prescribed displacement comprises acquiring the second image of the at least one corresponding reference-class image pair at the prescribed displacement.

11. The method of claim 4, wherein determining each respective image that is used as the second image of the at least one corresponding reference-class image pair based on a prescribed displacement comprises selecting the image which is closest to the prescribed displacement from a set of at least two candidate images.

12. The method of claim 11, wherein selecting the image which is closest to the prescribed displacement from the set of at least two candidate images comprises selecting an image from the set of at least two candidate images which is at the prescribed displacement.

13. The method of claim 1, wherein each image comprises a speckle pattern.

14. The method of claim 1, wherein each displacement between the images of a corresponding image pair is indicative of a corresponding movement of a surface which moves relative to a sensing device of the image-correlation-based displacement measuring system.

15. The method of claim 1, wherein at least one reference-class displacement is determined to a sub-pixel resolution during real-time operation of the image-correlation-based displacement measuring system.

16. The method of claim 1, wherein at least one reference-class displacement is determined to a sub-pixel resolution during real-time operation of the image-correlation-based displacement measuring system, and that at least one reference-class displacement and the corresponding reference-class image pair is recorded in the image-correlation-based displacement measuring system, for use during subsequent real-time operation of the image-correlation-based displacement measuring system.

17. The method of claim 1, wherein at least one reference-class displacement is determined to a sub-pixel resolution by a prescribed procedure prior to subsequent real-time operation of the image-correlation-based displacement measuring system, and that at least one reference-class displacement and the corresponding reference-class image pair is recorded in the image-correlation-based displacement measuring system, for use during subsequent real-time operation of the image-correlation-based displacement measuring system.

18. A method for determining accumulated displacement in an image-correlation-based displacement measuring system, comprising:

determining at least one reference-class displacement between the two images of at least one corresponding reference-class image pair, the two images of a reference-class image pair comprising a first image and a second image, each reference-class displacement being determined to a sub-pixel resolution; and determining an accumulated displacement based at least partially on the at least one reference-class displacement;

wherein:
the at least one reference-class displacement is determined in a manner that at least partially rejects an accumulation of systematic displacement estimate errors that arise from an image-correlation error characteristic having a period corresponding to a pitch of a pixel spacing used to acquire the first and second images; and the determining the reference class displacement in a manner that at least partially rejects the accumulation of the systematic displacement estimate errors comprises compensating that portion of the apparent displacement between the two images of the at least one corresponding reference-class image pair that corresponds to a fractional part of the pixel-spacing of the image-correlation based displacement measuring system, the compensation based on a pre-determined periodic error characteristic of the image-correlation-based displacement measuring system.

19. The method of claim 18, wherein the second image of at least one reference-class image pair is used as the first image of a spatially-adjacent reference-class image pair.

20. The method of claim 18, further comprising determining at least one additional displacement between the second image of a reference-class image pair and an additional image, wherein determining the accumulated displacement based at least partially on the at least one reference-class displacement comprises determining the accumulated displacement based at least partially on the at least one reference-class displacement and the at least one additional displacement.

21. The method of claim 18, wherein the pre-determined error characteristic of the image-correlation-based displacement measuring system comprises image displacement estimation errors which are periodic with a wavelength corresponding to the pitch of the pixel spacing used to acquire the first and second images.

22. The method of claim 21, wherein the image displacement estimation errors which are periodic with a wavelength corresponding to the pitch of the pixel-spacing are not specifically determined.

23. The method of claim 21, wherein the image displacement estimation errors which are periodic with a wavelength corresponding to a pixel-spacing of the image-correlation based displacement measuring system are specifically determined.

24. The method of claim 23, wherein the periodic image displacement estimation errors are specifically determined based on characteristics of a predetermined image displacement estimation error curve resulting from a representative image-correlation-based displacement measuring system operating on a representative pair of images.

25. The method of claim 23, wherein the periodic image displacement estimation errors are specifically determined based on characteristics of an image displacement estimation error curve resulting from the image-correlation-based displacement measuring system operating on at least one pair of images acquired by the image-correlation-based displacement measuring system.

26. A reference image updating circuit usable in an image-correlation-based displacement measuring system, wherein the reference image updating circuit determines the displacement between a current reference image and a new reference image to a sub-pixel resolution in a manner that at least partially rejects an accumulation of systematic displacement estimate errors that arise from an image-correlation error characteristic having a period corresponding to a pitch of a pixel spacing used to acquire the current and the new reference images.

27. The reference image updating circuit of claim 26, wherein the reference image updating circuit comprises at least a portion of a processor and at least a portion of an associated program.

28. An image-correlation-based displacement measuring system comprising:
   a readhead usable to acquire an image determined by an image-determining surface on a member movable relative to the readhead;
   a signal generating and processing circuitry element connected to the readhead, the signal generating and processing circuitry comprising a reference image updating portion which determines a reference displacement between a current reference image and a new reference image to a sub-pixel resolution, wherein:
   the reference image updating portion determines a reference displacement between the current reference image and the new reference image to a sub-pixel resolution in a manner that at least partially rejects an accumulation of systematic displacement estimate errors that arise from an image-correlation error characteristic having a period corresponding to a pitch of a pixel spacing used to acquire the current and new reference images.

29. The image-correlation-based displacement measuring system of claim 28, wherein the signal generating and processing circuitry element stores each determined reference displacement and determines at least one accumulated displacement between the image-determining surface and the read head along at least one axis based on at least one stored reference displacement and at least one additional displacement between a most recent reference image and an image corresponding to the position resulting from the accumulated displacement.

30. The image-correlation-based displacement measuring system of claim 28, wherein the readhead is a speckle-image readhead and the image-determining surface is an optically diffusing surface from which speckle images can be obtained.

31. The image-correlation-based displacement measuring system of claim 28, wherein the signal generating and processing circuitry element comprises a processor and an associated program.

32. An image-correlation-based displacement measuring system comprising:
   a readhead usable to acquire an image determined by an image-determining surface on a member movable relative to the readhead;
   a signal generating and processing circuitry element connected to the readhead, the signal generating and processing circuitry comprising a reference image updating portion which determines a reference displacement between a current reference image and a new reference image to a sub-pixel resolution, wherein:
   the reference image updating portion determines a reference displacement between the current reference image and the new reference image to a sub-pixel resolution in a maimer that at least partially rejects an accumulation of systematic displacement estimate errors that arise from an image-correlation error characteristic having a period corresponding to a pitch of a pixel spacing used to acquire the current and new reference images; and
   determining the reference displacement between the current reference image and the new reference image to a sub-pixel resolution in a maimer that at least partially rejects the accumulation of the systematic displacement estimate errors comprises at least one of a) compensating the apparent displacement between the current reference image and the new reference image based on a pre-determined error characteristic of the image-correlation-based displacement measuring system, b) determining the image that is used as the new reference image based on a prescribed displacement for the new reference image relative to the current reference image, the prescribed displacement having a sub-pixel resolution.

* * * * *